US009125155B2

(12) United States Patent
Yokoyama

(10) Patent No.: US 9,125,155 B2
(45) Date of Patent: Sep. 1, 2015

(54) WIRELESS COMMUNICATION DEVICE AND WIRELESS COMMUNICATION METHOD

(71) Applicant: FUJITSU LIMITED, Kawasaki-shi, Kanagawa (JP)

(72) Inventor: Hitoshi Yokoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 13/729,976

(22) Filed: Dec. 28, 2012

(65) Prior Publication Data
US 2014/0010097 A1 Jan. 9, 2014

(30) Foreign Application Priority Data

Jan. 6, 2012 (JP) .................................. 2012-001605

(51) Int. Cl.
H04J 1/16 (2006.01)
H04J 3/14 (2006.01)
H04L 1/00 (2006.01)
H04L 12/26 (2006.01)
G08C 17/00 (2006.01)
H04W 52/02 (2009.01)
H04W 88/02 (2009.01)
H04W 88/06 (2009.01)
H04W 36/24 (2009.01)

(52) U.S. Cl.
CPC ...... H04W 52/0209 (2013.01); H04W 52/0232 (2013.01); H04W 36/24 (2013.01); H04W 88/02 (2013.01); H04W 88/06 (2013.01)

(58) Field of Classification Search
None
See application file for complete search history.

(56) References Cited

U.S. PATENT DOCUMENTS

2008/0057912 A1* 3/2008 Deprun .......................... 455/413
2009/0207736 A1* 8/2009 Gong et al. ................... 370/238
2011/0055363 A1   3/2011 Kanno et al.
2011/0312288 A1* 12/2011 Fu et al. ......................... 455/88

FOREIGN PATENT DOCUMENTS

JP   2009-088976 A   4/2009
JP   2011-055124 A   3/2011

* cited by examiner

Primary Examiner — Kodzovi Acolatse
(74) Attorney, Agent, or Firm — Arent Fox LLP

(57) ABSTRACT

A wireless communication device including: a plurality of antennas configured to perform a plurality of wireless communication protocols simultaneously, and a processor configured to obtain each of a plurality of power consumptions for each of the plurality of the wireless communication protocols, to obtain each of a plurality of communication throughput for each of the plurality of the wireless communication protocols, to calculate an aggregated communication efficiency of the wireless communication using the plurality of wireless communication protocols simultaneously based on the plurality of the power consumptions and the plurality of the communication throughput, and to control the plurality of the antennas, when the aggregated communication efficiency exceeds a given value, as to perform the plurality of wireless communication protocols simultaneously, and, when the aggregated communication efficiency is equal to or less than the given value, as to stop one of the plurality of wireless communication protocols.

16 Claims, 15 Drawing Sheets

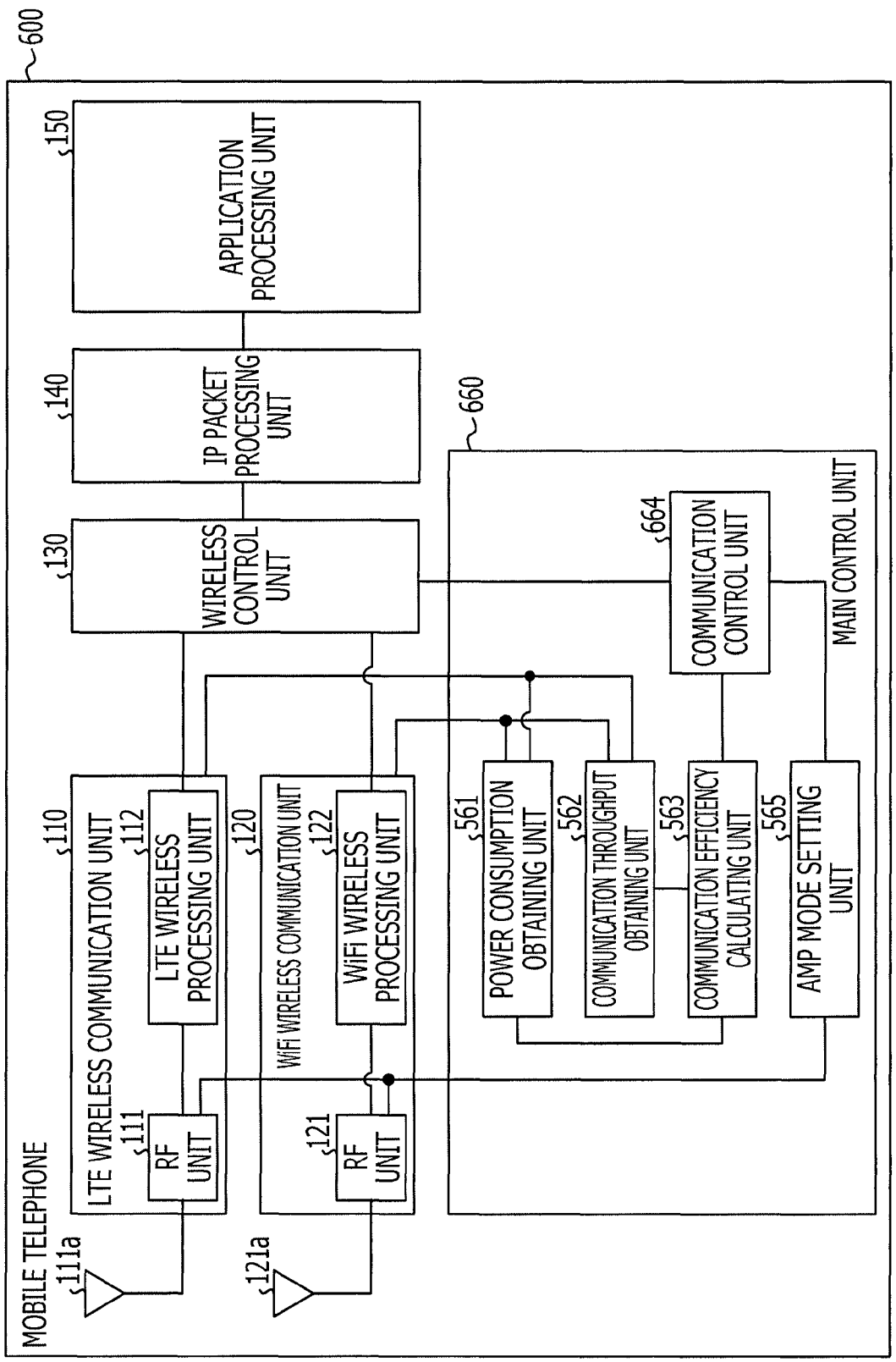

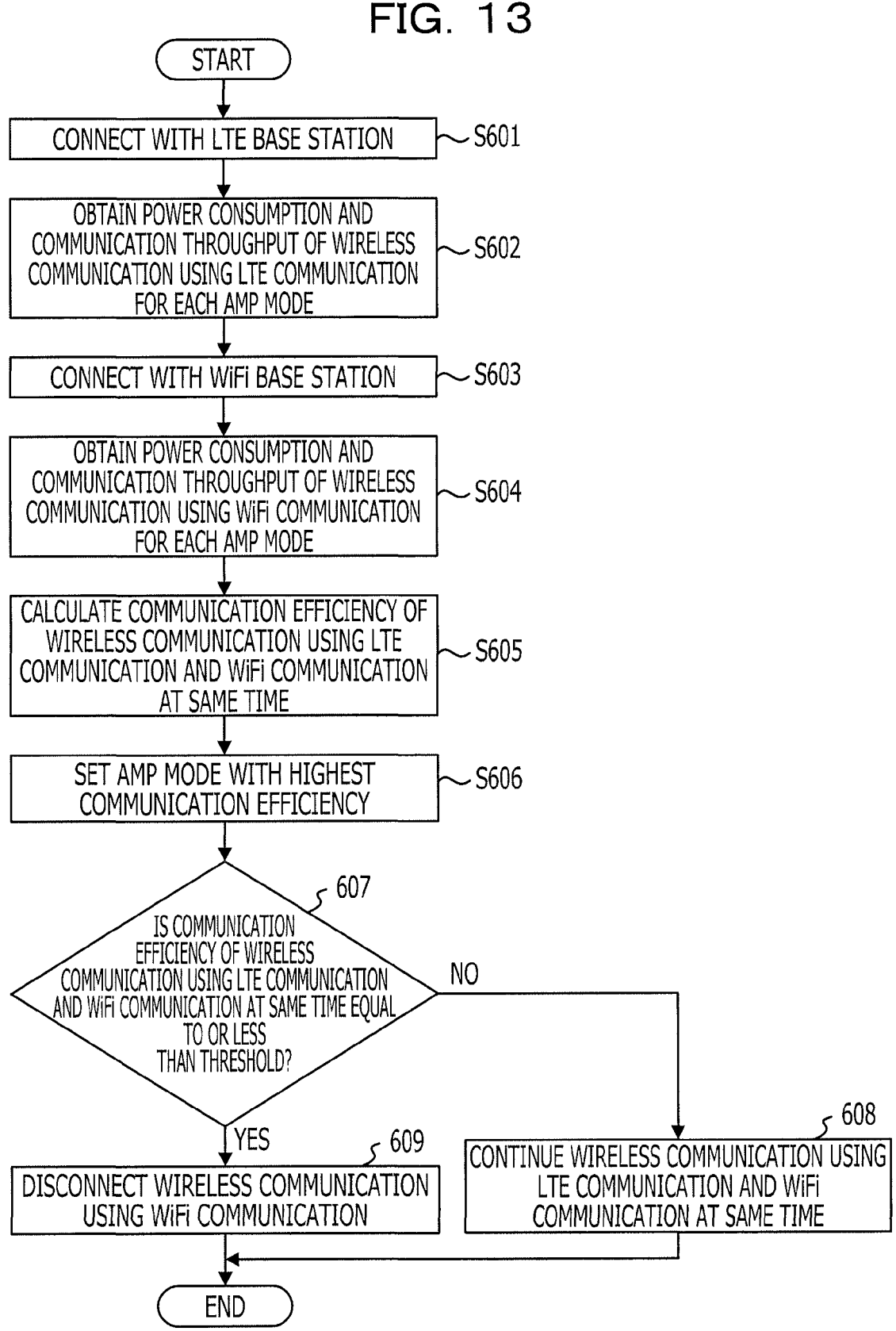

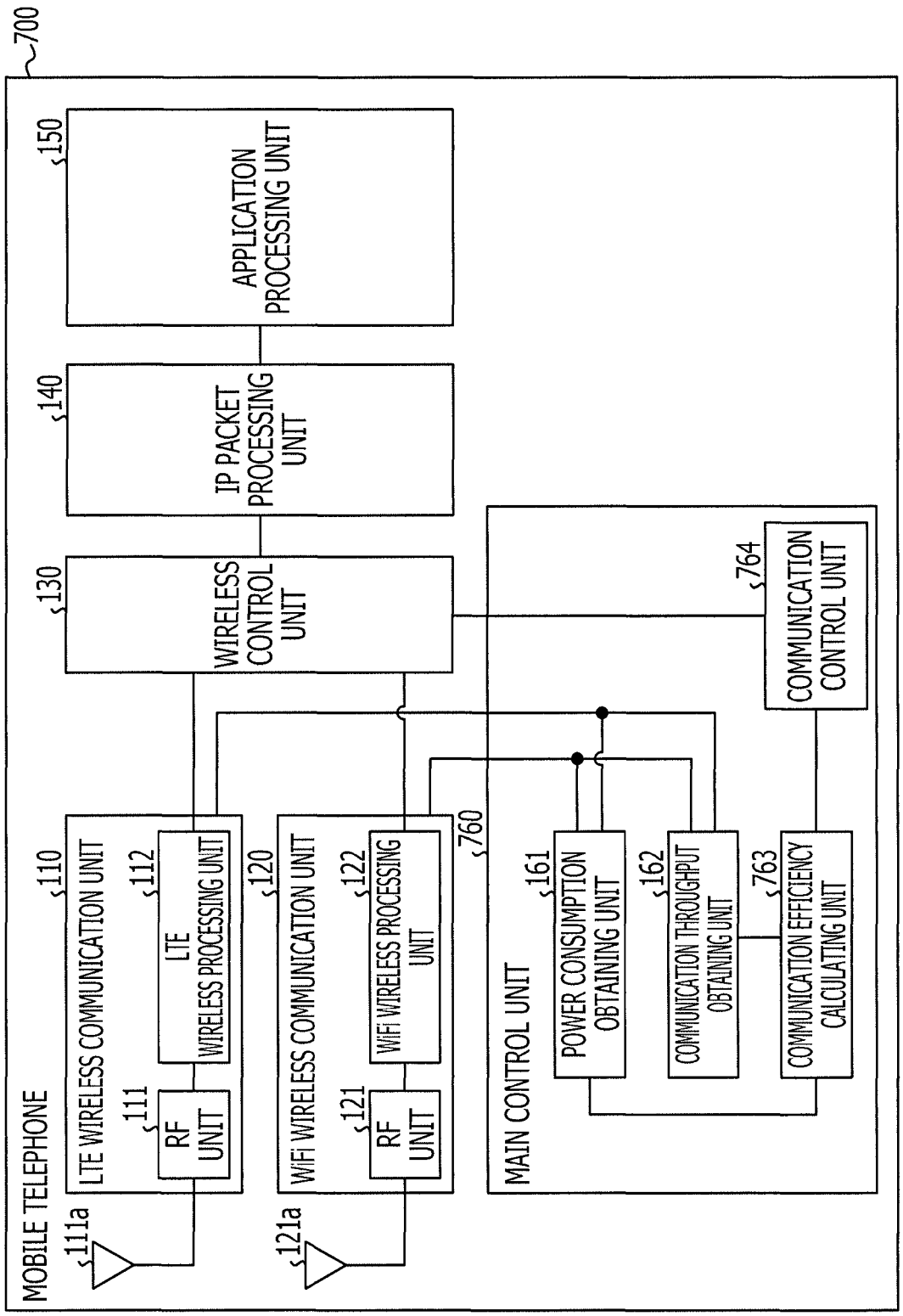

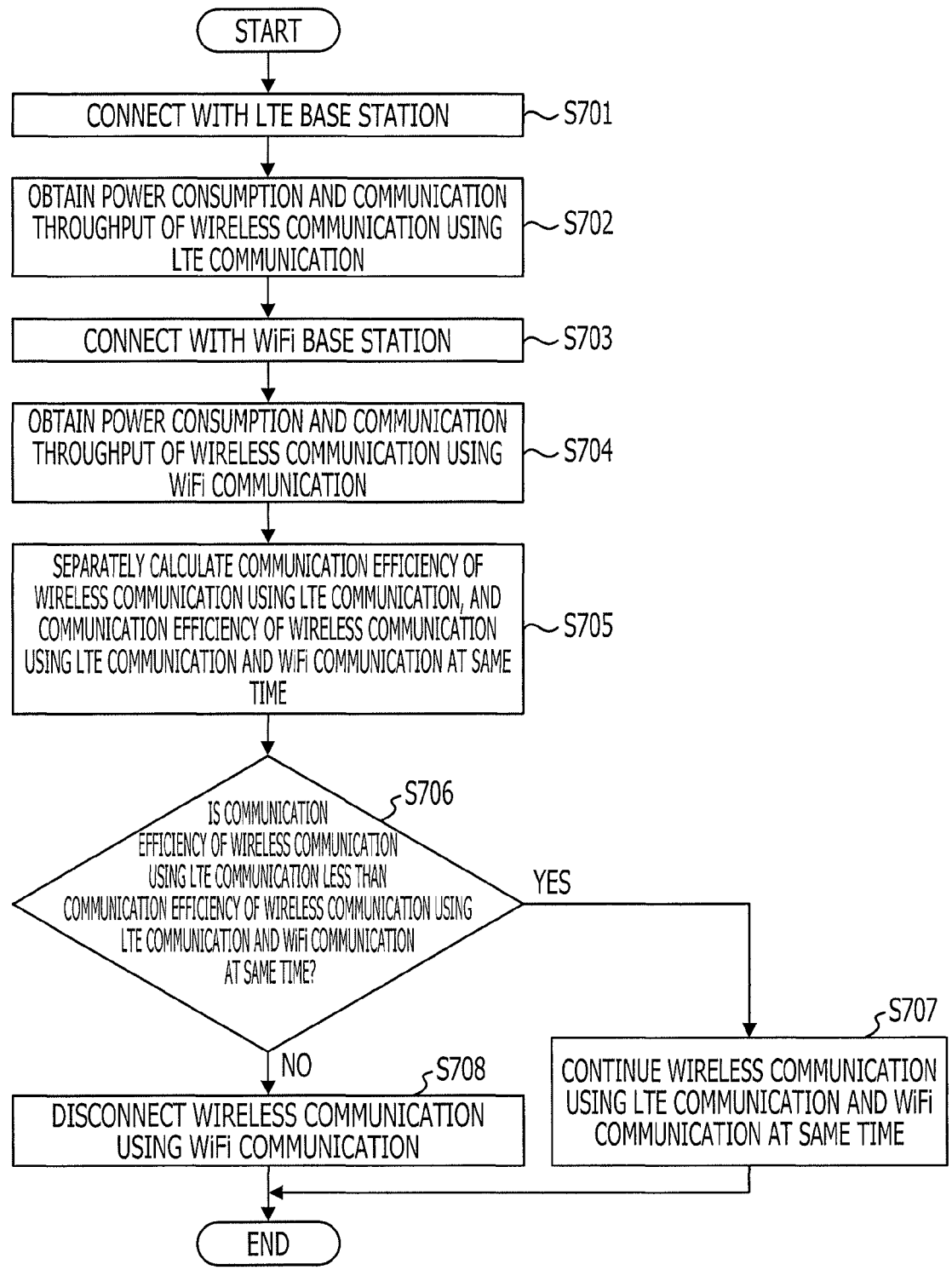

WIRELESS COMMUNICATION DEVICE AND WIRELESS COMMUNICATION METHOD

CROSS-REFERENCE TO RELATED APPLICATIONS

This application is based upon and claims the benefit of priority of the prior Japanese Patent Application No. 2012-001605, filed on Jan. 6, 2012, the entire contents of which are incorporated herein by reference.

FIELD

The embodiments discussed herein are related to a wireless communication device and a wireless communication method.

BACKGROUND

It is known link aggregation (LA) as a technique for achieving the same communication throughput as wired communication in wireless communication. Wireless communication in LA is performed by using multiple communication protocols such as the long term evolution (LTE) and the wireless fidelity (WiFi) (trademark) at the same time.

In this type of LA, communication throughput of wireless communication may be increased as more communication protocols are used. However, the power consumption for wireless communication increases when more communication protocols are used.

It is known a technique to reduce power consumption for wireless communication by selecting the communication protocol having the best communication efficiency among a plurality of communication protocols. For example, there is a technique in which the power consumption and the communication throughput for each communication protocol is obtained, and an amount of power consumption per bit is calculated as communication efficiency on the basis of the power consumptions and communication throughputs so that the communication protocol with the lowest amount of power consumption per bit is selected.

The related-art techniques have been disclosed in Japanese Laid-open Patent Publication No. 2009-88976 and No. 2011-55124.

SUMMARY

According to an aspect of the invention, a wireless communication device including: a plurality of antennas configured to perform a plurality of wireless communication protocols corresponding to a plurality of wireless communication systems simultaneously, and a processor configured to obtain each of a plurality of power consumptions for each of the plurality of the wireless communication protocols, to obtain each of a plurality of communication throughput for each of the plurality of the wireless communication protocols, to calculate an aggregated communication efficiency of the wireless communication using the plurality of wireless communication protocols simultaneously based on the plurality of the power consumptions and the plurality of the communication throughput, and to control the plurality of the antennas, when the aggregated communication efficiency exceeds a given value, as to perform the plurality of wireless communication protocols simultaneously, and, when the aggregated communication efficiency is equal to or less than the given value, as to stop one of the plurality of wireless communication protocols.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates a configuration of a mobile station according to a sixth embodiment.

FIG. 13 is a flow chart of processing by the mobile station according to the sixth embodiment.

FIG. 14 illustrates a configuration of a mobile station according to a seventh embodiment.

FIG. 15 is a flow chart of processing by the mobile station according to the seventh embodiment.

DESCRIPTION OF EMBODIMENTS

However, according to the above conventional art, only one communication protocol having the lowest power consumption per bit may be selected. That is, in the conventional art, performing communication control using a plurality of communication protocols at the same time with regard to communication efficiency is not considered. As a result, there is a problem in the conventional art in that although an increase in power consumption may be suppressed, high communication throughput are not attained.

In consideration of the above problem, it is an object of the embodiments discussed herein to provide a wireless communication device and a wireless communication method that are able to suppress increases in power consumption.

The following is a detailed explanation of an embodiment of the wireless communication device and the wireless communication method disclosed hereinbelow with reference to the accompanying drawings. The embodiments are not limited to the features disclosed herein. For example, although the following embodiments describe a mobile station as an example of a wireless communication device, the embodiments are not limited as such and may refer to a wireless communication device equipped with a wireless communication function that uses a plurality of communication protocols at the same time.

Embodiment 1

Figure 1:
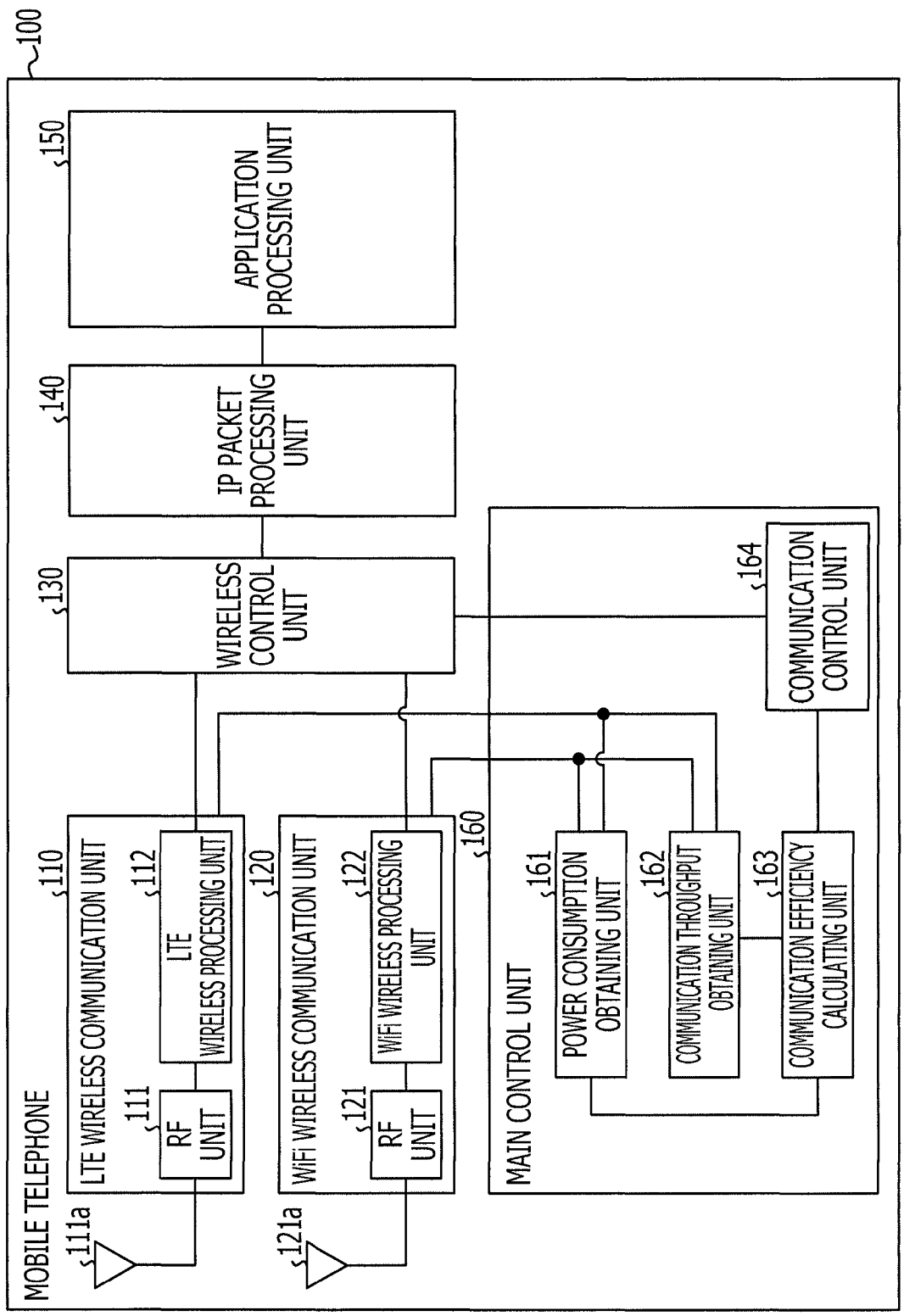
FIG. 1 illustrates a configuration of a mobile station according to a first embodiment.

First, an explanation of a mobile station according to a first embodiment will be provided. FIG. 1 illustrates a configuration of a mobile station according to the first embodiment. As illustrated in FIG. 1, a mobile station 100 according to the first embodiment includes an LTE wireless communication unit 110, a WiFi wireless communication unit 120, a wireless control unit 130, an IP packet processing unit 140, an application processing unit 150, and a main control unit 160. The mobile station 100 is described as being equipped with the LTE wireless communication unit 110 and the WiFi wireless communication unit 120 as wireless communication units using two different communication protocols. However, the mobile station 100 may be equipped with two or more wireless communication units using a plurality of communication protocols.

The LTE wireless communication unit 110 performs wireless communication of various types of data with an LTE base station in compliance with the LTE communication. Specifically, the LTE wireless communication unit 110 includes a radio frequency (RF) unit 111 and an LTE wireless processing unit 112.

The RF unit 111 performs digital/analog (D/A) conversion, performs up-converting from a baseband frequency to a wireless frequency, and amplifies electrical power with an amplifier to transmit uplink signals from an antenna 111a. The RF unit 111 performs down-converting from a wireless frequency to a baseband frequency on downlink signals received from the antenna 111a, and performs A/D conversion.

The LTE wireless processing unit 112 adds retransmission information to IP packet data, performs multilevel modulation and error correction code addition, and generates uplink signals. The LTE wireless processing unit 112 performs decoding of the error correction codes and demodulation on the downlink signals.

The WiFi wireless communication unit 120 performs wireless communication of various types of data with a WiFi base station in compliance with the WiFi communication. Specifically, the WiFi wireless communication unit 120 includes a RF unit 121 and a WiFi wireless processing unit 122.

The RF unit 121 performs digital/analog (D/A) conversion, performs up-converting from a baseband frequency to a wireless frequency, and amplifies electrical power with an amplifier to transmit uplink signals from an antenna 121a. The RF unit 121 performs down-converting from a wireless frequency to a baseband frequency on downlink signals received from the antenna 121a, and performs A/D conversion.

The WiFi wireless processing unit 122 adds retransmission information to IP packet data, performs multilevel modulation and error correction code addition, and generates uplink signals. The WiFi wireless processing unit 122 performs decoding of the error correction codes and demodulation on the downlink signals.

The wireless control unit 130 is connected to the LTE base station and controls the wireless communication of various types of data with an LTE base station in compliance with the LTE communication by controlling the LTE wireless communication unit 110. The wireless control unit 130 is connected to a WiFi base station and controls the wireless communication of various types of data with a WiFi base station in compliance with the WiFi communication by controlling the WiFi wireless communication unit 120. The wireless control unit 130 has a pre-stored policy for adding a connection to a WiFi base station in compliance with the WiFi communication after connecting to an LTE base station in compliance with the LTE communication.

The wireless control unit 130 executes wireless communication using the LTE communication and the WiFi communication at the same time according to an instruction from a below mentioned communication control unit 164. For example, the wireless control unit 130 sorts IP packets with sequence numbers added thereto to the LTE wireless communication unit 110 and the WiFi wireless communication unit 120 after the sequence numbers that indicate the order of transmitting data are added to the IP packet data. For example, the wireless control unit 130 collects IP packets with the sequence numbers added thereto from the LTE wireless communication unit 110 and the WiFi wireless communication unit 120, and rearranges the order of the IP packet data on the basis of the sequence numbers added to the collected IP packets.

The wireless control unit 130 disconnects wireless communication using either of the communication among the LTE communication and the WiFi communication and executes wireless communication using the remaining communication according to an instruction from the communication control unit 164. For example, the wireless control unit 130 sorts IP packet data with sequence numbers added thereto to only the LTE wireless communication unit 110 if the wireless communication using the WiFi communication is disconnected. For example, the wireless control unit 130 collects IP packet data with the sequence numbers added thereto from only the LTE wireless communication unit 110, and rearranges the order of the IP packet data on the basis of the sequence numbers added to the collected IP packet data.

The IP packet processing unit 140 removes destination IP address information from the IP packet data obtained from the wireless control unit 130, and outputs the IP packet data to the application processing unit 150. The IP packet processing unit 140 adds destination IP address information to the IP packet data obtained from the application processing unit 150, and outputs the IP packet data to the wireless control unit 130.

The application processing unit 150 uses the IP packet data obtained from the IP packet processing unit 140 to execute certain applications. For example, the application processing unit 150 plays moving image data when the IP packet data is moving image data, or displays still image data on a display and the like when the IP packet data is still image data.

The main control unit 160 controls the wireless communication using the LTE communication and the WiFi communication at the same time (hereinbelow referred to as "synchronized wireless communication") by controlling the wireless control unit 130. The main control unit 160 includes a power consumption obtaining unit 161, a communication throughput obtaining unit 162, a communication efficiency calculating unit 163, and the communication control unit 164.

The power consumption obtaining unit obtains power consumption of each wireless communication protocol according to the communication s. Specifically, the power consumption obtaining unit 161 obtains the power consumption of the wireless communication being performed in compliance with the LTE communication by the LTE wireless communication unit 110. The power consumption obtaining unit 161 obtains the power consumption of the wireless communication being performed in compliance with the WiFi communication by the WiFi wireless communication unit 120. Hereinbelow, wireless communication being performed in compliance with the LTE communication by the LTE wireless communication unit 110 will be referred to as "wireless communication using the LTE communication." Hereinbelow, wireless communication being performed in compliance with the WiFi communication by the WiFi wireless communication unit 120 will be referred to as "wireless communication using the WiFi communication."

The communication throughput obtaining unit 162 obtains a communication throughput for each wireless communication protocol according to the communication s. Specifically, the communication throughput obtaining unit 162 measures the wireless quality of the wireless communication using the LTE communication and refers to an internal table in which the wireless quality and the communication throughput are associated with each other to obtain the communication throughput corresponding to the measured wireless quality. The communication throughput obtaining unit 162 measures the wireless quality of the wireless communication using the WiFi communication and refers to an internal table to obtain the communication throughput corresponding to the measured wireless quality.

The communication efficiency calculating unit 163 calculates the communication efficiency of the wireless communication (synchronized wireless communication) using the LTE communication and the WiFi communication at the same time, on the basis of power consumptions obtained for each of the wireless communication protocols according to each communication and the communication throughput obtained for each of the wireless communication protocols according to each communication. Specifically, the communication efficiency calculating unit 163 obtains the power consumption for the wireless communication using the LTE communication and the power consumption for the wireless communication using the WiFi communication from the power consumption obtaining unit 161. The communication efficiency calculating unit 163 obtains the communication throughput for the wireless communication using the LTE communication and the communication throughput for the wireless communication using the WiFi communication from the communication throughput obtaining unit 162. The communication efficiency calculating unit 163 adds the power consumption for the wireless communication using the LTE communication and the power consumption for the wireless communication using the WiFi communication to calculate the power consumption during synchronized wireless communication. The communication efficiency calculating unit 163 adds the communication throughput for the wireless communication using the LTE communication and the communication throughput for the wireless communication using the WiFi communication to calculate the communication throughput during synchronized wireless communication. The communication efficiency calculating unit 163 divides the communication throughput during synchronized wireless communication by the power consumption during synchronized wireless communication to obtain the communication efficiency during synchronized wireless communication.

The communication control unit 164 obtains the communication efficiency during synchronized wireless communication from the communication efficiency calculating unit 163. The communication control unit 164 internally retains a certain threshold. The communication control unit 164 determines whether the communication efficiency during synchronized wireless communication is equal to or less than the certain threshold. The communication control unit 164 instructs the wireless control unit 130 to continue the wireless communication using the LTE communication and the WiFi communication at the same time if the communication efficiency during synchronized wireless communication exceeds the threshold. Conversely, the communication control unit 164 instructs the wireless control unit 130 to disconnect the wireless communication using the WiFi communication that was added most recently if the communication efficiency during synchronized wireless communication is equal to or less than the threshold.

An explanation will be provided below of a detailed example of control of wireless communication using the LTE communication and the WiFi communication at the same time. First, an explanation will be provided of an example in which the wireless communication is continued using the LTE communication and the WiFi communication at the same time. In the example, it is assumed that the communication throughput and the power consumption for the wireless communication using the LTE communication are 100 Mbps and 1 W respectively, and the communication throughput and the power consumption for the wireless communication using the WiFi communication are 30 Mbps and 0.2 W respectively.

In this example, the communication efficiency calculating unit 163 adds the power consumption for the wireless communication using the LTE communication and the power consumption for the wireless communication using the WiFi communication to obtain the power consumption during synchronized wireless communication as 1.2 W. The communication efficiency calculating unit 163 adds the communication throughput for the wireless communication using the LTE communication and the communication throughput for the wireless communication using the WiFi communication to obtain the communication throughput during synchronized wireless communication as 130 Mbps. The communication efficiency calculating unit 163 divides the communication throughput during synchronized wireless communication by the power consumption during synchronized wireless communication to obtain the communication efficiency during synchronized wireless communication as 108 Mbps/W.

The communication control unit 164 continues the wireless communication using the LTE communication and the WiFi communication at the same time since the communication efficiency during synchronized wireless communication that is 108 Mbps/W is greater than the certain threshold (e.g., 50 Mbps/W). As a result, the communication throughput related to the wireless communication is improved.

The following is an explanation of an example in which the wireless communication using the LTE communication and the WiFi communication where the WiFi communication is added after the LTE communication. In the example, it is assumed that the communication throughput and the power consumption for the wireless communication using the LTE communication are 30 Mbps and 0.2 W respectively, and the communication throughput and the power consumption for the wireless communication using the WiFi communication are 10 Mbps and 1 W respectively.

In this example, the communication efficiency calculating unit 163 adds the power consumption for the wireless communication using the LTE communication and the power consumption for the wireless communication using the WiFi communication to obtain the power consumption during synchronized wireless communication as 1.2 W. The communication efficiency calculating unit 163 calculates the communication throughput using the LTE communication as 40 Mbps. The communication efficiency calculating unit 163 divides the communication throughput during synchronized wireless communication by the power consumption during synchronized wireless communication to obtain the communication efficiency during synchronized wireless communication as 33 Mbps/W.

The communication control unit 164 disconnects the wireless communication using the WiFi communication that was added after the LTE communication since the communication efficiency during synchronized wireless communication that is 33 Mbps/W is less than the certain threshold that is 50 Mbps/W. As a result, an increase in the power consumption related to the wireless communication is suppressed.

Figure 2:
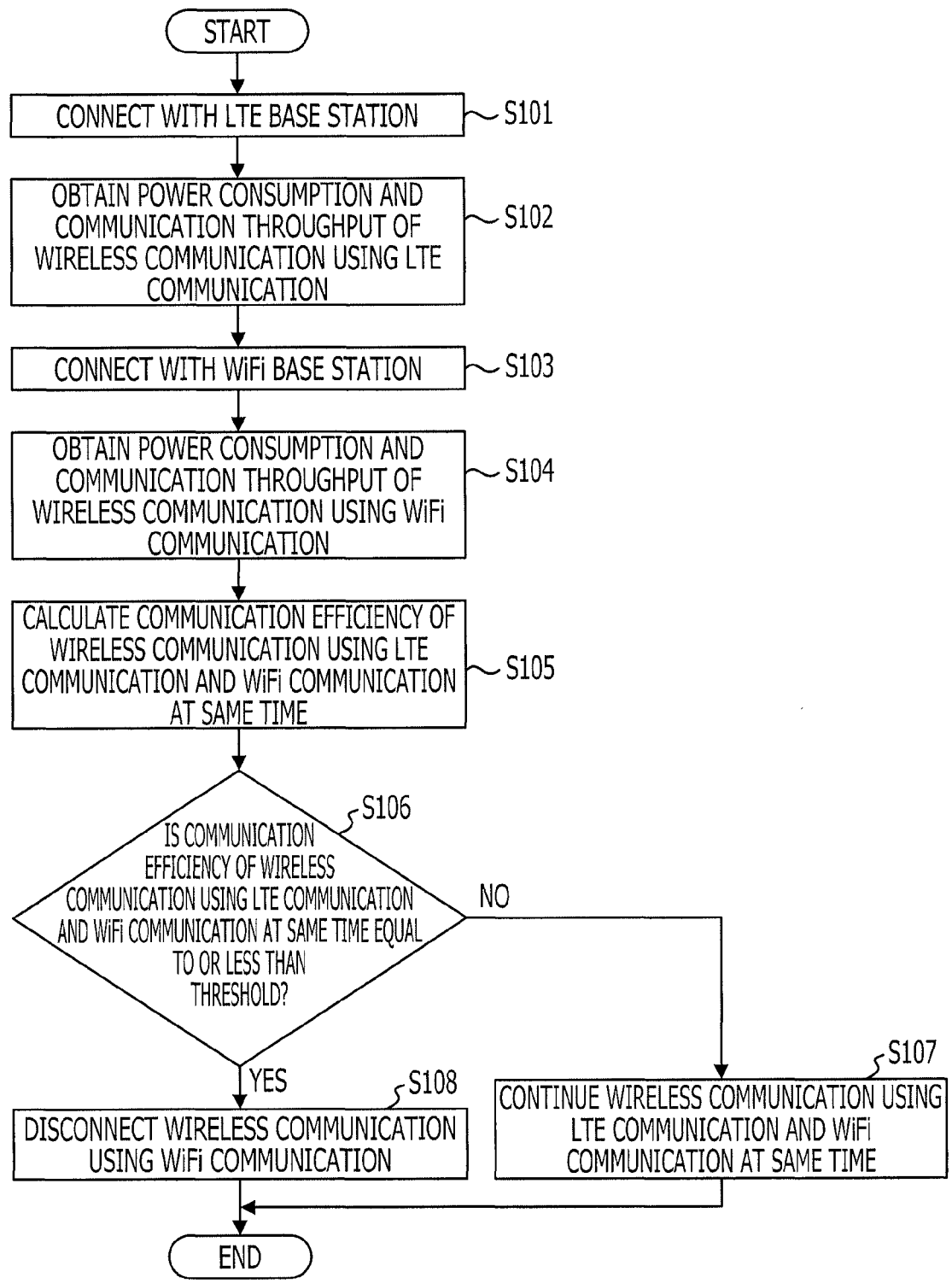
FIG. 2 is a flow chart of processing by the mobile station according to the first embodiment.

An explanation of a process flow by a mobile station according to the first embodiment will be provided next. FIG. 2 is a flow chart of processing by a mobile station according to the first embodiment. As illustrated in FIG. 2, the wireless control unit 130 of the mobile station 100 is controlled by the LTE wireless communication unit 110 to connect with a LTE base station according to a policy stored in advance (step S101). The power consumption obtaining unit 161 of the main control unit 160 obtains the power consumption of the wireless communication using the LTE communication, and the communication throughput obtaining unit 162 obtains the communication throughput of the wireless communication using the LTE communication (step S102).

The wireless control unit 130 controls the WiFi wireless communication unit 120 to connect with a WiFi base station (step S103). As a result, wireless communication is started using the LTE communication and the WiFi communication at the same time. The power consumption obtaining unit 161 of the main control unit 160 obtains the power consumption of the wireless communication using the WiFi communication, and the communication throughput obtaining unit 162 obtains the communication throughput of the wireless communication using the WiFi communication (step S104).

The communication efficiency calculating unit 163 calculates the communication efficiency of the wireless communication using the LTE communication and the WiFi communication at the same time, on the basis of the power consumptions and the communication throughput obtained for each of the wireless communication protocols according to each communication (step S105).

The communication control unit 164 determines whether the communication efficiency of the wireless communication using the LTE communication and the WiFi communication at the same time (synchronized wireless communication) is equal to or less than the threshold (step S106). If the communication efficiency during synchronized wireless communication exceeds the threshold (step S106: No), the communication control unit 164 instructs the wireless control unit 130 to continue the wireless communication using the LTE communication and the WiFi communication at the same time (step S107).

Conversely, if the communication efficiency during synchronized wireless communication is equal to or less than the threshold (step S106: Yes), the communication control unit 164 instructs the wireless control unit 130 to disconnect the wireless communication using the WiFi communication that was added most recently (step S108).

As described above, the mobile station 100 according to the first embodiment calculates the communication efficiency of wireless communication using a plurality of communication protocols at the same time on the basis of the power consumption and the communication throughput obtained for each of the communication protocols. The mobile station 100 continues the wireless communication using the plurality of communication protocols at the same time if the communication efficiency of the wireless communication using the plurality of communication protocols at the same time exceeds a threshold, and disconnects the wireless communication using the most recently added communication protocol of the plurality of communication protocols if the communication efficiency of the wireless communication using the plurality of communication protocols at the same time is equal to or less than the threshold. As a result, the mobile station 100 according to the first embodiment improves communication throughput while suppressing an increase in power consumption.

Embodiment 2

First, an explanation of a mobile station according to a second embodiment will be provided. The mobile station according to the second embodiment is similar to the first embodiment except that a communication efficiency calculating unit 263 and a communication control unit 264 are provided respectively in place of the communication efficiency calculating unit 163 and the communication control unit 164 in the mobile station of the first embodiment. Explanations of features and elements that are similar to those of the first embodiment will be omitted.

Figure 3:
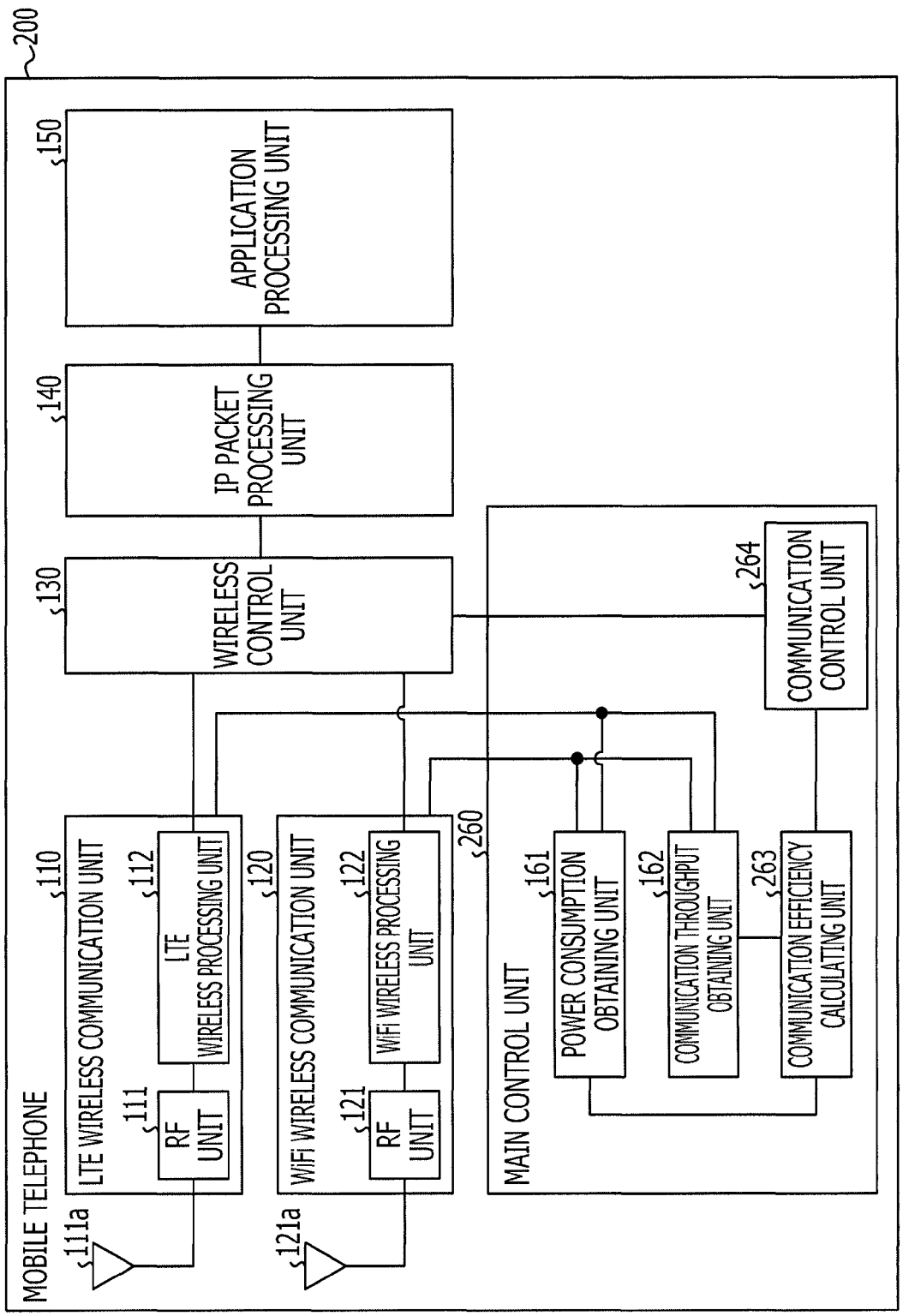
FIG. 3 illustrates a configuration of a mobile station according to a second embodiment.

FIG. 3 illustrates a configuration of a mobile station according to the second embodiment. As illustrated in FIG. 3, a mobile station 200 according to the second embodiment respectively includes the communication efficiency calculating unit 263 and the communication control unit 264 in place of the communication efficiency calculating unit 163 and the communication control unit 164 in the mobile station of the first embodiment.

The communication efficiency calculating unit 263 calculates the communication efficiency of the wireless communication using the LTE communication and the WiFi communication at the same time (synchronized wireless communication), on the basis of power consumptions and the communication throughput obtained for each of the wireless communication protocols according to each communication. In addition, the communication efficiency calculating unit 263 calculates the communication efficiencies of the wireless communication when the LTE communication and the WiFi communication are used separately, on the basis of the power consumptions and the communication throughput obtained for each of the wireless communication protocols according to each communication. Specifically, the communication efficiency calculating unit 263 obtains the power consumption for the wireless communication using the LTE communication and the power consumption for the wireless communication using the WiFi communication from the power consumption obtaining unit 161. The communication efficiency calculating unit 263 obtains the communication throughput of the wireless communication using the LTE communication and the communication throughput of the wireless communication using the WiFi communication from the communication throughput obtaining unit 162. The communication efficiency calculating unit 263 divides the communication throughput of the wireless communication using the LTE communication by the power consumption of the wireless communication using the LTE communication to calculate the communication efficiency of the wireless communication when the LTE communication is used separately. The communication efficiency calculating unit 263 divides the communication throughput of the wireless communication using the WiFi communication by the power consumption of the wireless communication using the WiFi communication to calculate the communication efficiency of the wireless communication when the WiFi communication is used separately.

The communication control unit 264 obtains the communication efficiency during synchronized wireless communication from the communication efficiency calculating unit 263. The communication control unit 264 obtains the communication efficiencies calculated separately for each communication from the communication efficiency calculating unit 263. The communication control unit 264 retains a certain threshold internally. The communication control unit 264 determines whether the communication efficiency during synchronized wireless communication is equal to or less than the certain threshold and instructs the wireless control unit 130 to continue the wireless communication using the LTE communication and the WiFi communication at the same time if the communication efficiency during synchronized wireless communication exceeds the threshold. Conversely, the communication control unit 264 instructs the wireless control unit 130 to disconnect the wireless communication using the communication with the lowest communication efficiency calculated separately for each communication if the communication efficiency during synchronized wireless communication is equal to or less than the threshold. For example, if the communication efficiency of wireless communication using a communication B is the lowest among communications A, B, and C, the communication control unit 264 instructs the wireless control unit 130 to disconnect the wireless communication using the communication B.

Figure 4:
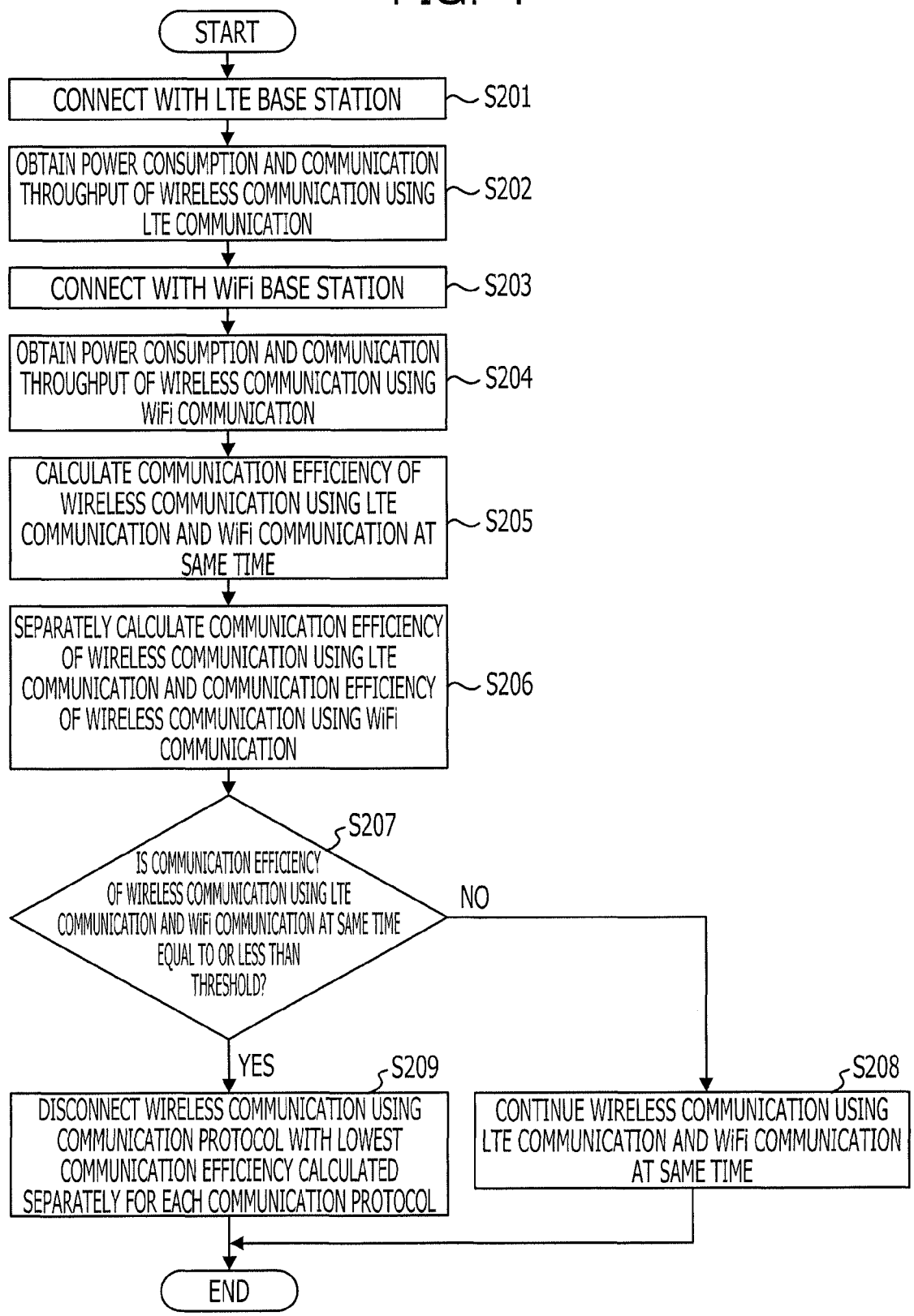
FIG. 4 is a flow chart of processing by the mobile station according to the second embodiment.

An explanation of processing by the mobile station according to the second embodiment will be provided. FIG. 4 is a flow chart of processing by the mobile station according to the second embodiment. The steps S201 to S205 in FIG. 4 are similar to the steps S101 to S105 in FIG. 2 and explanations thereof will be omitted.

The communication efficiency calculating unit 263 separately calculates the communication efficiencies of the wireless communication using the LTE communication and the wireless communication using the WiFi communication, on the basis of the power consumptions and the communication throughput obtained for each of the wireless communication protocols according to each communication (step S206).

The communication control unit 264 determines whether the communication efficiency of the wireless communication using the LTE communication and the WiFi communication at the same time (synchronized wireless communication) is equal to or less than the threshold (step S207). If the communication efficiency during synchronized wireless communication exceeds the threshold (step S207: No), the communication control unit 264 instructs the wireless control unit 130 to continue the wireless communication using the LTE communication and the WiFi communication at the same time (step S208).

Conversely, if the communication efficiency during synchronized wireless communication is equal to or less than the threshold (step S207: Yes), the communication control unit 264 instructs the wireless control unit 130 to disconnect the wireless communication using the communication that has the lowest communication efficiency (step S209).

As described above, the mobile station 200 according to the second embodiment disconnects the wireless communication using the communication protocol with the lowest communication efficiency among the plurality of communication protocols if the communication efficiency of the wireless communication using the plurality of communication protocols at the same time is equal to or less than the threshold. As a result, the mobile station 200 according to the second embodiment minimizes the decrease in communication throughput and reduces power consumption when disconnecting the wireless communication using any of the communication protocols among the plurality of communication protocols.

Embodiment 3

Next, an explanation of a mobile station according to a third embodiment will be provided. The mobile station according to the third embodiment is similar to the mobile station according to the first embodiment except that a data monitoring unit 365 is further provided and a communication control unit 364 is provided in place of the communication control unit 164 in the mobile station of the first embodiment. Explanations of features and elements that are similar to those of the first embodiment will be omitted.

Figure 5:
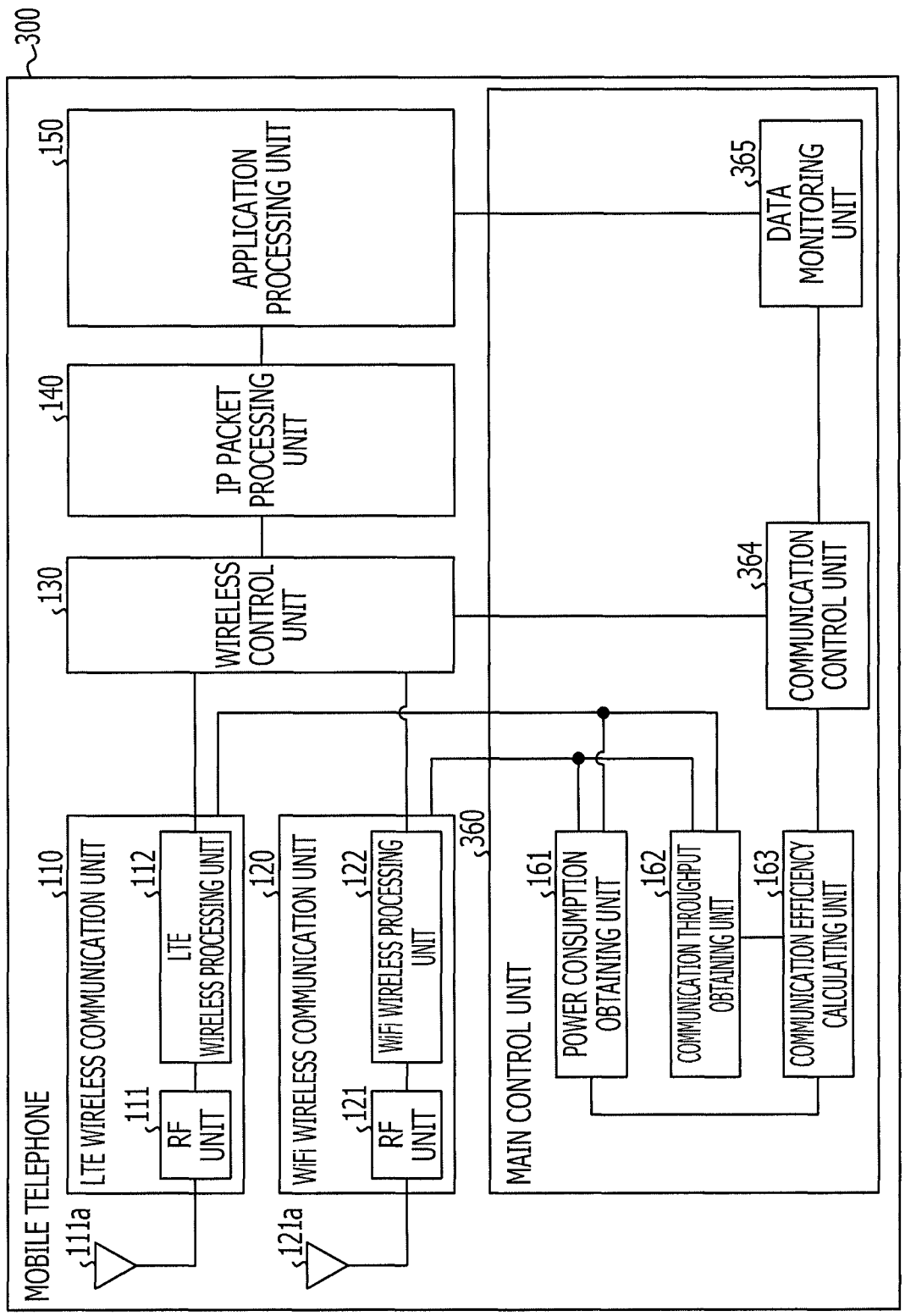
FIG. 5 illustrates a configuration of a mobile station according to a third embodiment.

FIG. 5 illustrates a configuration of a mobile station according to the third embodiment. As illustrated in FIG. 5, a mobile station 300 according to the third embodiment includes the data monitoring unit 365 in addition to the units provided in the mobile station 100 according to the first embodiment. The mobile station 300 according to the third embodiment includes the communication control unit 364 in place of the communication control unit 164 in the mobile station according to the first embodiment.

The data monitoring unit 365 monitors whether data transmitted through the wireless communication using the LTE communication and the WiFi communication at the same time is communication throughput guaranteed data that includes a requested communication throughput that is a certain communication throughput requested for real-time transmission of the data. The communication throughput guaranteed data includes moving image data used for playing video images such as in games and the like, and voice over internet protocol (VoIP) data that is packet data used in voice communication.

The data monitoring unit 365 extracts the requested communication throughput from data that is detected as communication throughput guaranteed data, and outputs the requested communication throughput to the communication control unit 364.

The communication control unit 364 obtains the communication efficiency during synchronized wireless communication from the communication efficiency calculating unit 163. The communication control unit 364 obtains the requested communication throughput from the data monitoring unit 365. The communication control unit 364 retains a certain threshold internally. The communication control unit 364 determines whether the communication efficiency during synchronized wireless communication is equal to or less than the certain threshold. The communication control unit 364 instructs the wireless control unit 130 to continue the wireless communication using the LTE communication and the WiFi communication at the same time if the communication efficiency during synchronized wireless communication exceeds the threshold.

Alternatively, the communication control unit 364 performs the following processing if the data transmitted during the synchronized wireless communication detected by the data monitoring unit 365 is the communication throughput guaranteed data when the communication efficiency during the synchronized wireless communication is equal to or less than the threshold. That is, the communication control unit 364 determines whether the communication throughput of the wireless communication using a communication protocol other than the communication protocol added most recently among the plurality of communication protocols satisfies the requested communication throughput. For example, the communication control unit 364 determines whether the communication throughput of the wireless communication using the LTE communication other than the WiFi communication that was added most recently satisfies the requested communication throughput. The communication control unit 364 instructs the wireless control unit 130 to continue the wireless communication using the LTE communication and the WiFi communication at the same time if the communication throughput of the wireless communication using the LTE communication does not satisfy the requested communication throughput. The communication control unit 364 instructs the wireless control unit 130 to disconnect the wireless communication using the WiFi communication that was most recently added if the communication throughput of the wireless communication using the LTE communication satisfies the requested communication throughput.

The communication control unit 364 performs the following processing if the data transmitted during the synchronized wireless communication detected by the data monitoring unit 365 is not communication throughput guaranteed data when the communication efficiency during the synchronized wireless communication is equal to or less than the threshold. Specifically, the communication control unit 364 instructs the wireless control unit 130 to disconnect the wireless communication using the WiFi communication that was most recently added.

Figure 6:
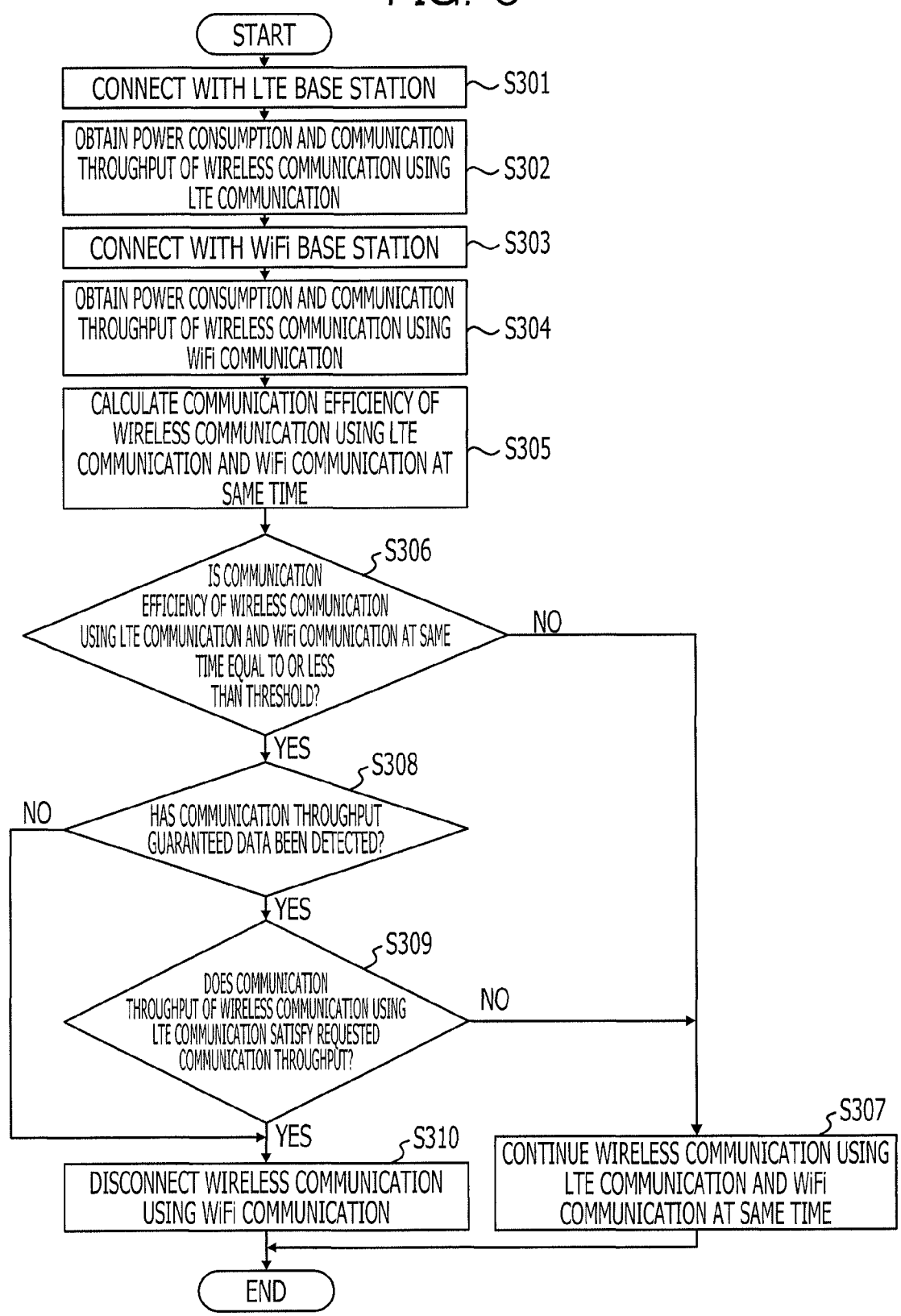
FIG. 6 is a flow chart of processing by the mobile station according to the third embodiment.

Next, an explanation of processing by the mobile station according to the third embodiment will be provided. FIG. 6 is a flow chart of processing by the mobile station according to the third embodiment. The steps S301 to S305 in FIG. 6 are similar to the steps S101 to S105 in FIG. 2 and explanations thereof will be omitted.

The communication control unit 364 determines whether the communication efficiency of the wireless communication using the LTE communication and the WiFi communication at the same time (synchronized wireless communication) is equal to or less than the threshold (step S306). If the communication efficiency during synchronized wireless communication exceeds the threshold (step S306: No), the communication control unit 364 instructs the wireless control unit 130 to continue the wireless communication using the LTE communication and the WiFi communication at the same time (step S307).

If the communication efficiency during synchronized wireless communication is equal to or less than the threshold (step S306: Yes), the communication control unit 364 determines whether a detection result that indicates whether the data transmitted during the synchronized wireless communication is communication throughput guaranteed data has been received from the data monitoring unit 365 (step S308).

If the detection result that indicates that the data is communication throughput guaranteed data is received (step S308: Yes), the communication control unit 364 determines whether the wireless communication using the LTE communication satisfies the requested communication throughput (step S309). If the communication control unit 364 determines that the communication throughput of the wireless communication using the LTE communication does not satisfy the requested communication throughput (step S309: No), the processing advances to step S307.

If the detection result that indicates that the data is communication throughput guaranteed data is not received (step S308: No), or the communication control unit 364 determines that the communication throughput of the wireless communication using the LTE communication satisfies the requested communication throughput (step S309: Yes), the following processing is performed. Specifically, the communication control unit 364 instructs the wireless control unit 130 to disconnect the wireless communication using the WiFi communication (step S310).

As described above, the mobile station 300 according to the third embodiment monitors whether the transmitted data is communication throughput guaranteed data if the communication efficiency of the wireless communication using the LTE communication and the WiFi communication at the same time is equal to or less than the threshold. The mobile station 300 determines whether the communication throughput of the wireless communication using the LTE communication other than the most recently added WiFi communication satisfies the requested communication throughput if the transmitted data is detected as communication throughput guaranteed data. The mobile station 300 disconnects the communication throughput of the wireless communication using the most recently added WiFi communication if the communication throughput of the wireless communication using the LTE communication satisfies the requested communication throughput. Conversely, the mobile station 300 continues the wireless communication using the LTE communication and the WiFi communication at the same time if the communication throughput of the wireless communication using the LTE communication does not satisfy the requested communication throughput. As a result, the mobile station 300 according to the third embodiment is able to reduce an increase in power consumption while prioritizing the communication throughput guarantee of the communication throughput guaranteed data in which a certain communication throughput is requested.

Embodiment 4

Next, an explanation of a mobile station according to a fourth embodiment will be provided. The mobile station according to the fourth embodiment is similar to the mobile station according to the first embodiment except that a remaining battery capacity obtaining unit 465 and a threshold updating unit 466 are further provided and a communication control unit 464 is provided in place of the communication control unit 164 in the mobile station of the first embodiment. Explanations of features and elements that are similar to those of the first embodiment will be omitted.

Figure 7:
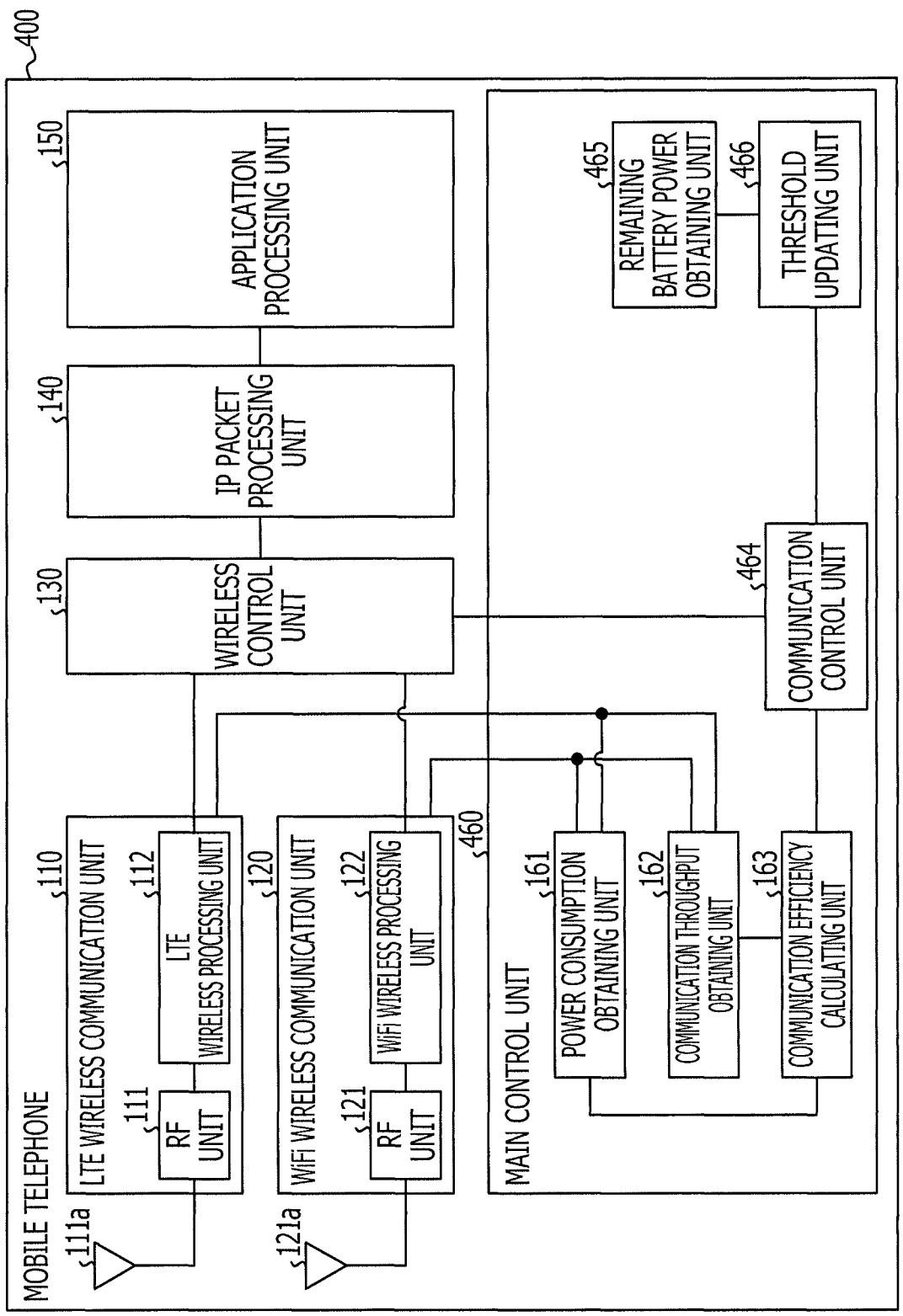
FIG. 7 illustrates a configuration of a mobile station according to a fourth embodiment.

FIG. 7 illustrates a configuration of the mobile station according to the fourth embodiment. As illustrated in FIG. 7, a mobile station 400 according to the fourth embodiment includes the remaining battery capacity obtaining unit 465 and the threshold updating unit 466 in addition to the units provided in the mobile station 100 according to the first embodiment. The mobile station 400 according to the fourth embodiment includes the communication control unit 464 in place of the communication control unit 164 in the mobile station 100 according to the first embodiment.

The remaining battery capacity obtaining unit 465 obtains a remaining battery capacity that represents the remaining capacity of a battery mounted in the mobile station 400. The remaining battery capacity obtaining unit 465 outputs the obtained remaining battery capacity to the threshold updating unit 466.

The threshold updating unit 466 receives the remaining battery capacity from the remaining battery capacity obtaining unit 465. The threshold updating unit 466 updates a threshold retained in the communication control unit 464 so that the threshold retained in the communication control unit 464 increases correspondingly to a decrease in the remaining battery capacity.

Figure 8:
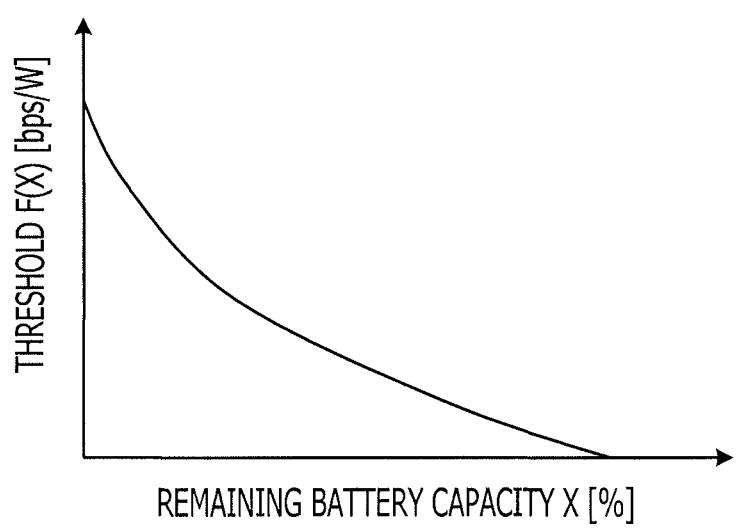
FIG. 8 describes a correspondence relation of remaining battery capacity and a threshold.

FIG. 8 describes a correspondence relation of remaining battery capacity and the threshold. The horizontal axis in FIG. 8 represents a remaining battery capacity X [%], and the vertical axis represents a threshold $F(X)$ [bps/W] retained in the communication control unit 464. As illustrated in FIG. 8, the threshold $F(X)$ retained in the communication control unit 464 increases correspondingly to a decrease in the remaining battery capacity X.

The communication control unit 464 obtains the communication efficiency during synchronized wireless communication from the communication efficiency calculating unit 163. The threshold that the communication control unit 464 retains internally is automatically updated by the threshold updating unit 466. The communication control unit 464 determines whether the communication efficiency during synchronized wireless communication is equal to or less than the threshold updated by the threshold updating unit 466. The communication control unit 464 instructs the wireless control unit 130 to continue the wireless communication using the LTE communication and the WiFi communication at the same time if the communication efficiency during synchronized wireless communication exceeds the threshold updated by the threshold updating unit 466.

Conversely, the communication control unit 464 instructs the wireless control unit 130 to disconnect the wireless communication using the WiFi communication that was added most recently if the communication efficiency during synchronized wireless communication is equal to or less than the threshold updated by the threshold updating unit 466.

Figure 9:
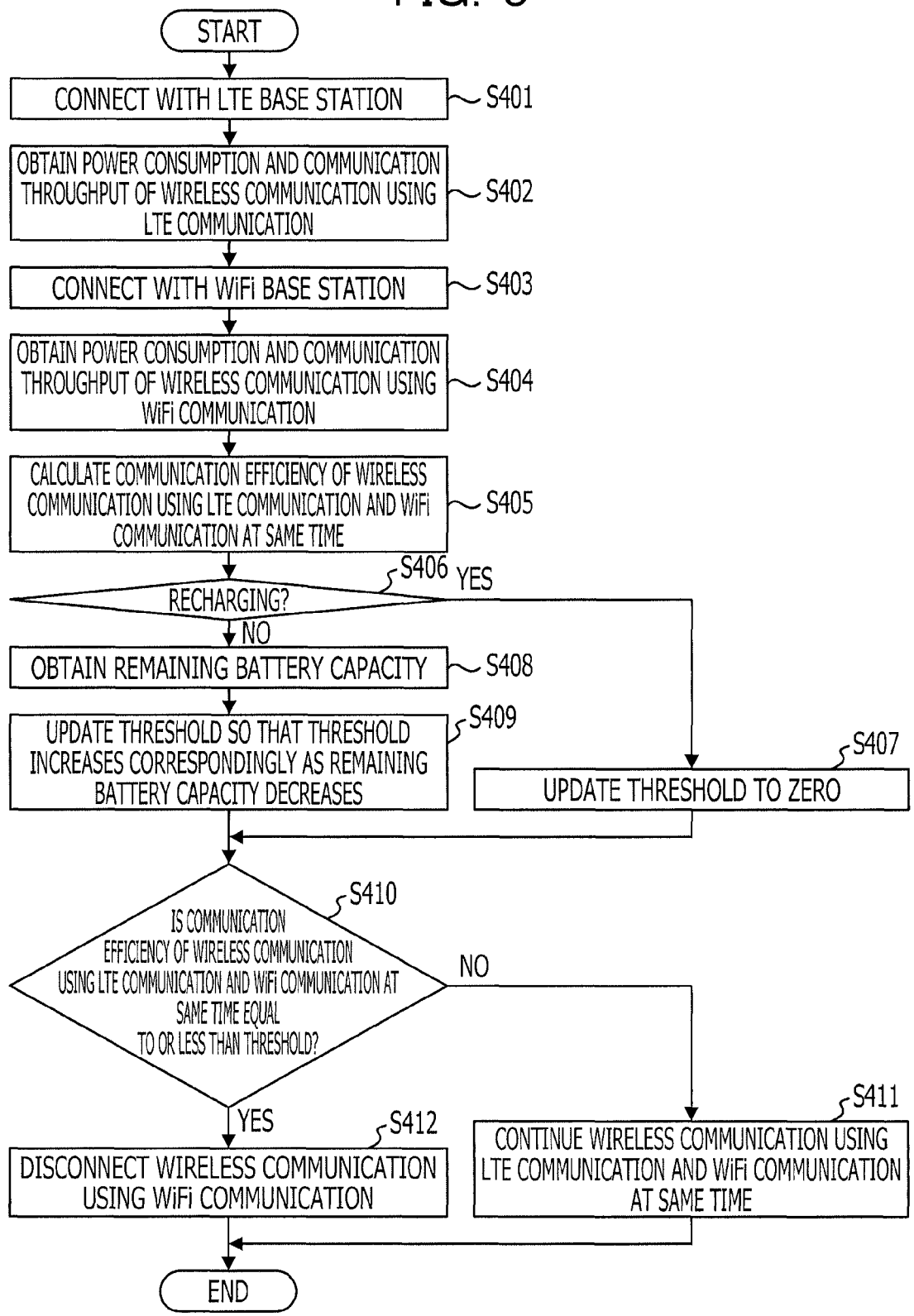
FIG. 9 is a flow chart of processing by the mobile station according to the fourth embodiment.

Next, an explanation of processing by the mobile station according to the fourth embodiment will be provided. FIG. 9 is a flow chart of processing by the mobile station according to the fourth embodiment. The steps S401 to S405 in FIG. 9 are similar to the steps S101 to S105 in FIG. 2 and explanations thereof will be omitted.

The threshold updating unit 466 determines whether the mobile station 400 is recharging (step S406). If the mobile station 400 is recharging (step S406: Yes), the threshold updating unit 466 updates the threshold held in the communication control unit 464 to zero (step S407) and the processing advances to step S410.

Alternatively, if the mobile station 400 is not recharging (step S406: No), the remaining battery capacity obtaining unit 465 obtains the remaining battery capacity and outputs the remaining battery capacity to the threshold updating unit 466 (step S408). The threshold updating unit 466 updates the threshold so that the threshold held in the communication control unit 464 increases correspondingly to a decrease in the remaining battery capacity (step S409).

The communication control unit 464 determines whether the communication efficiency of the wireless communication using the LTE communication and the WiFi communication at the same time (synchronized wireless communication) is equal to or less than the threshold (step S410). If the communication efficiency during synchronized wireless communication exceeds the threshold (step S410: No), the communication control unit 464 instructs the wireless control unit 130 to continue the wireless communication using the LTE communication and the WiFi communication at the same time (step S411).

If the communication efficiency during synchronized wireless communication is equal to or less than the threshold (step S410: Yes), the communication control unit 464 instructs the wireless control unit 130 to disconnect the wireless communication using the WiFi communication that was added most recently (step S412).

As described above, the mobile station 400 according to the fourth embodiment automatically updates the threshold so that the threshold increases correspondingly to a decrease in the remaining battery capacity. The mobile station 400 disconnects the wireless communication using the most recently added communication protocol of the plurality of communication protocols if the communication efficiency of the wireless communication using the plurality of communication protocols at the same time is equal to or less than the updated threshold. As a result, the mobile station 400 according to the fourth embodiment effectively suppresses any increases in the power consumption as the remaining battery capacity falls.

Embodiment 5

Next, an explanation of a mobile station according to a fifth embodiment will be provided. The mobile station according to the fifth embodiment is similar to the first embodiment except that a main control unit 560 is provided in place of the main control unit 160 of the mobile station according to the first embodiment, and a plurality of amplifiers are mounted in the RF units 111 and 121. Explanations of features and elements that are similar to those of the first embodiment will be omitted.

Figure 10:
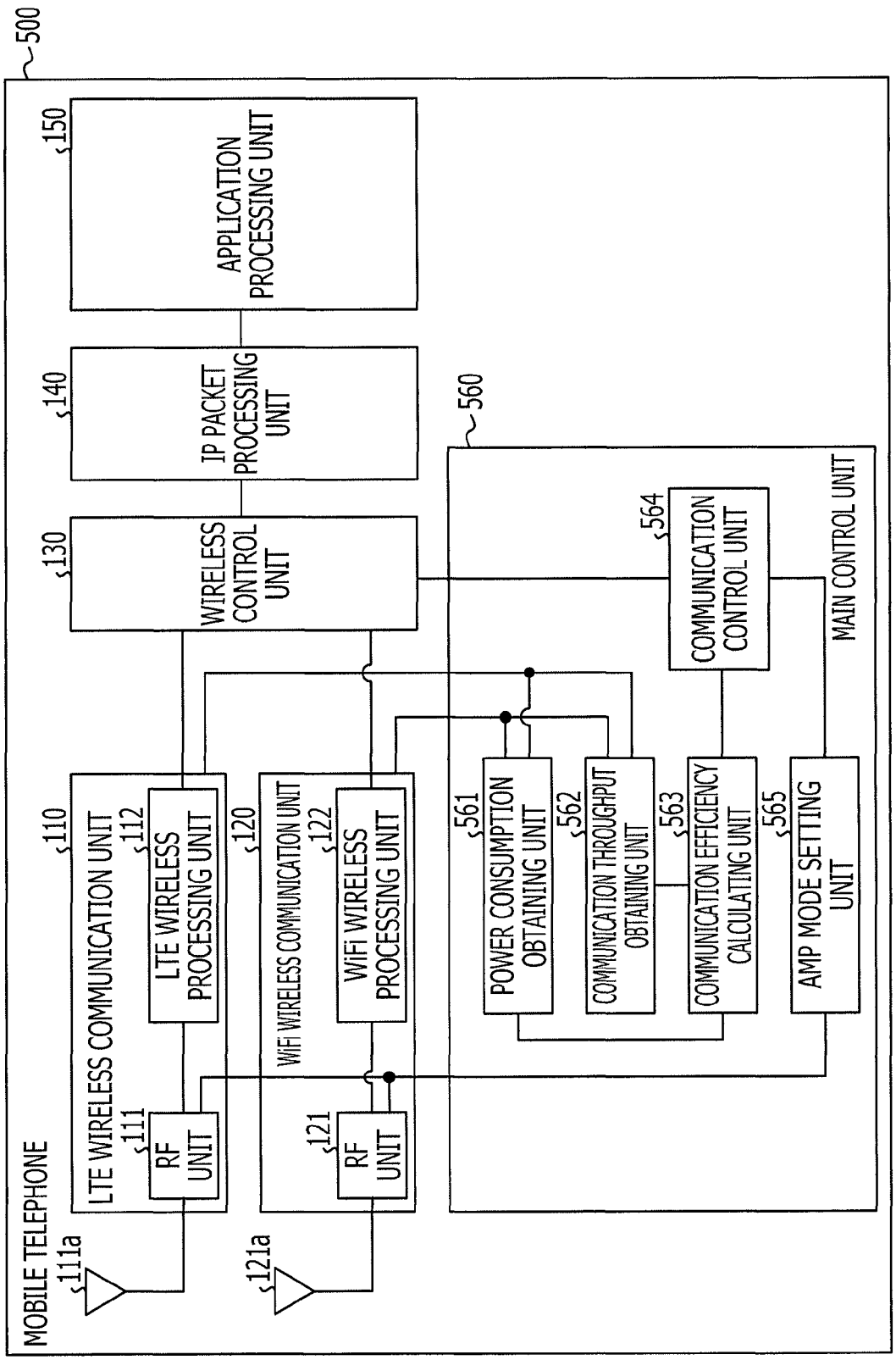
FIG. 10 illustrates a configuration of a mobile station according to a fifth embodiment.

FIG. 10 illustrates a configuration of the mobile station according to the fifth embodiment. As illustrated in FIG. 10, a mobile station 500 according to the fifth embodiment includes the main control unit 560 in place of the main control unit 160 in the mobile station 100 according to the first embodiment.

Moreover, a plurality of amplifiers is mounted in the RF unit 111 of the LTE wireless communication unit 110 and in the RF unit 121 of the WiFi wireless communication unit 120. In other words, the LTE wireless communication unit 110 and the WiFi wireless communication unit 120 have a plurality of switchable amp modes in which the number of amplifiers applicable to the wireless communication are different. In the present embodiment, it is assumed that the LTE wireless communication unit 110 and the WiFi wireless communication unit 120 have two amp modes: an amp mode H for two amplifiers, and an amp mode L for one amplifier.

The main control unit 560 includes a power consumption obtaining unit 561, a communication throughput obtaining unit 562, a communication efficiency calculating unit 563, a communication control unit 564, and an amp mode setting unit 565.

The power consumption obtaining unit 561 obtains power consumptions for each combination of the amp modes and the wireless communication protocols according to the communication systems. Specifically, the power consumption obtaining unit 561 obtains the power consumption of the wireless communication using the LTE communication in each amp mode. The power consumption obtaining unit 561 obtains the power consumption of the wireless communication using the WiFi communication in each amp mode.

The communication throughput obtaining unit 562 obtains communication throughput for each combination of the amp modes and the wireless communication protocols according to the communication s. Specifically, the communication throughput obtaining unit 562 obtains the communication throughput of the wireless communication using the LTE communication in each amp mode. The communication throughput obtaining unit 562 obtains the communication throughput of the wireless communication using the WiFi communication in each amp mode.

The communication efficiency calculating unit 563 calculates the communication efficiency of the wireless communication using the LTE communication and the WiFi communication at the same time (synchronized wireless communication), on the basis of the power consumptions and the communication throughput obtained for each of the combinations of the amp modes and the wireless communication protocols according to each communication. Specifically, the communication efficiency calculating unit 563 obtains the power consumption for the wireless communication using the LTE communication and the power consumption for the wireless communication using the WiFi communication for each amp mode from the power consumption obtaining unit 561. The communication efficiency calculating unit 563 obtains the communication throughput of the wireless communication using the LTE communication and the communication throughput of the wireless communication using the WiFi communication for each amp mode from the communication throughput obtaining unit 562. The communication efficiency calculating unit 563 adds the power consumption for the wireless communication using the LTE communication and the power consumption for the wireless communication using the WiFi communication to calculate the power consumption during synchronized wireless communication in each amp mode. The communication efficiency calculating unit 563 adds the communication throughput for the wireless communication using the LTE communication and the communication throughput for the wireless communication using the WiFi communication to calculate the communication throughput during synchronized wireless communication in each amp mode. The communication efficiency calculating unit 563 divides the communication throughput during synchronized wireless communication by the power consumption during synchronized wireless communication to obtain the communication efficiency during synchronized wireless communication in each amp mode.

The communication control unit 564 correspondingly prioritizes the communication efficiency corresponding to the amp mode with the highest communication throughput among the communication efficiencies calculated by the communication efficiency calculating unit 563, and compares the prioritized communication efficiency with a threshold. The communication control unit 564 instructs the wireless control unit 130 to disconnect the wireless communication using the most recently added WiFi communication if the communication efficiency corresponding to the amp mode with the lowest communication throughput is equal to or below the threshold.

The communication control unit 564 controls the amp mode setting unit 565 to switch between the amp modes in the LTE wireless communication unit 110 and the WiFi wireless communication unit 120.

The amp mode setting unit 565 is controlled by the communication control unit 564 to switch the amp mode settings of the LTE wireless communication unit 110 and the WiFi wireless communication unit 120 between the amp mode H and the amp mode L.

Figure 11:
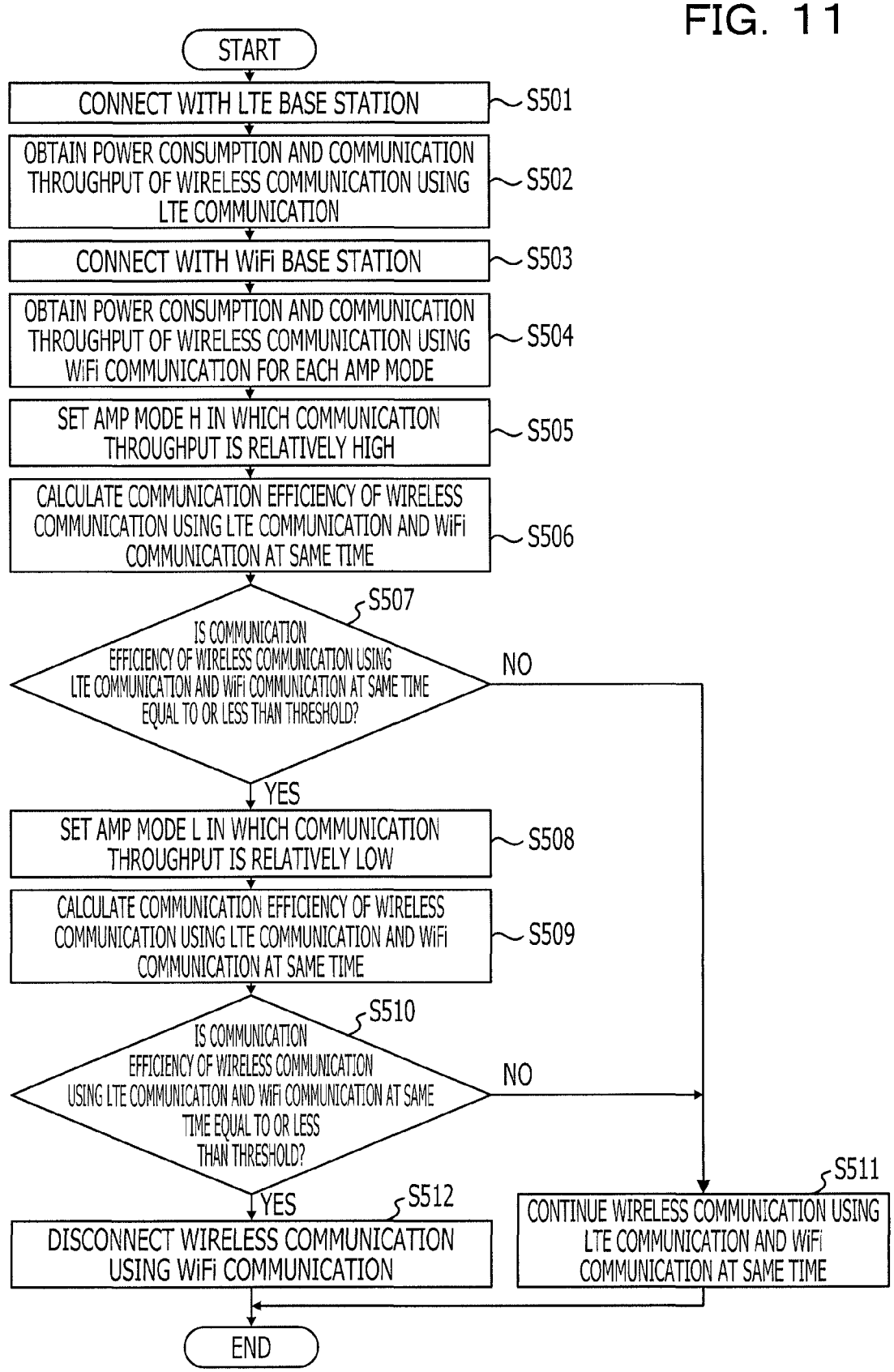
FIG. 11 is a flow chart of processing by the mobile station according to the fifth embodiment.

Next, an explanation of the mobile station according to the fifth embodiment will be provided. FIG. 11 is a flow chart of processing by the mobile station according to the fifth embodiment. As illustrated in FIG. 11, first the wireless control unit 130 of the mobile station 500 is controlled by the LTE wireless communication unit 110 to connect with a LTE base station according to a policy stored in advance (step S501). The power consumption obtaining unit 561 of the main control unit 560 obtains the power consumption of the wireless communication using the LTE communication, and the communication throughput obtaining unit 562 obtains the communication throughput of the wireless communication using the LTE communication (step S502). The power consumption obtaining unit 561 and the communication throughput obtaining unit 562 set the respective amp modes to default amp modes and respectively obtain the power consumptions and the communication throughput.

The wireless control unit 130 controls the WiFi wireless communication unit 120 to connect with a WiFi base station (step S503). As a result, wireless communication is started using the LTE communication and the WiFi communication at the same time. The power consumption obtaining unit 561 of the main control unit 560 obtains the power consumption of the wireless communication using the WiFi communication for each amp mode, and the communication throughput obtaining unit 562 obtains the communication throughput of the wireless communication using the WiFi communication for each amp mode (step S504).

The communication control unit 564 controls the amp mode setting unit 565 to set the amp mode H with a relatively high communication throughput (step S505). The communication efficiency calculating unit 563 calculates the communication efficiency of the wireless communication using the LTE communication and the WiFi communication at the same time, on the basis of the power consumptions and the communication throughput obtained as a combination of the wireless communication protocols according to each communication and the amp mode H (step S506).

The communication control unit 564 determines whether the communication efficiency of the wireless communication using the LTE communication and the WiFi communication at the same time (synchronized wireless communication) is equal to or less than the threshold (step S507). If the communication efficiency during synchronized wireless communication exceeds the threshold (step S507: No), the processing advances to step S511.

Conversely, if the communication efficiency during synchronized wireless communication is equal to or less than the threshold (step S507: Yes), the communication control unit 564 controls the amp mode setting unit 565 to set the amp mode L with a relatively low communication throughput (step S508). The communication efficiency calculating unit 563 calculates the communication efficiency of the wireless communication using the LTE communication and the WiFi communication at the same time, on the basis of the power consumptions and the communication throughput obtained as a combination of the wireless communication protocols according to each communication and the amp mode L (step S509).

The communication control unit 564 determines whether the communication efficiency of the wireless communication using the LTE communication and the WiFi communication at the same time (synchronized wireless communication) is equal to or less than the threshold (step S510). If the communication efficiency during synchronized wireless communication exceeds the threshold (step S510: No), the communication control unit 564 instructs the wireless control unit 130 to continue the wireless communication using the LTE communication and the WiFi communication at the same time (step S511).

Conversely, if the communication efficiency during synchronized wireless communication is equal to or less than the threshold (step S510: Yes), the communication control unit 564 instructs the wireless control unit 130 to disconnect the wireless communication using the WiFi communication that was added most recently (step S512).

As described above, the mobile station 500 according to the fifth embodiment prioritizes the communication efficiency corresponding to the amp mode with the highest communication throughput and compares the prioritized communication efficiency with the threshold. The mobile station 500 disconnects the wireless communication using the most recently added communication protocol among the plurality of communication protocols if the communication efficiency corresponding to the amp mode with the lowest communication throughput is equal to or less than the threshold. As a result, the mobile station 500 according to the fifth embodiment is able to set an optimal amp mode while improving communication throughput and suppressing power consumption.

Embodiment 6

Next, an explanation of a mobile station according to a sixth embodiment will be provided. The mobile station according to the sixth embodiment is similar to the mobile station according to the first embodiment except that a communication control unit 664 is provided in place of the communication control unit 564 in the mobile station of the fifth embodiment. Explanations of features and elements that are similar to those of the first embodiment will be omitted.

FIG. 12 illustrates a configuration of the mobile station according to the sixth embodiment. As illustrated in FIG. 12, a mobile station 600 according to the sixth embodiment is similar to the mobile station 500 according to the fifth embodiment except that the communication control unit 664 is provided in place of the communication control unit 564 in the mobile station of the fifth embodiment.

The communication control unit 664 selects an amp mode corresponding to the highest communication efficiency among the communication efficiencies calculated by the communication efficiency calculating unit 563, and compares the highest communication efficiency with the threshold. The communication control unit 664 instructs the wireless control unit 130 to disconnect the wireless communication using the most recently added WiFi communication if the communication efficiency corresponding to the amp mode with the highest communication efficiency is equal to or below the threshold.

Next, an explanation of processing by the mobile station according to the sixth embodiment will be provided. FIG. 13 is a flow chart of the processing by the mobile station according to the sixth embodiment. As illustrated in FIG. 13, first the wireless control unit 130 of the mobile station 600 is controlled by the LTE wireless communication unit 110 to connect with a LTE base station according to a policy stored in advance (step S601). The power consumption obtaining unit 561 of the main control unit 660 obtains the power consumption of the wireless communication using the LTE communication for each amp mode, and the communication throughput obtaining unit 562 obtains the communication throughput of the wireless communication using the LTE communication for each amp mode (step S602).

The wireless control unit 130 controls the WiFi wireless communication unit 120 to connect with a WiFi base station (step S603). As a result, wireless communication is started using the LTE communication and the WiFi communication at the same time. The power consumption obtaining unit 561 of the main control unit 660 obtains the power consumption of the wireless communication using the WiFi communication for each amp mode, and the communication throughput obtaining unit 562 obtains the communication throughput of the wireless communication using the WiFi communication for each amp mode (step S604).

The communication efficiency calculating unit 563 calculates the communication efficiency of the wireless communication using the LTE communication and the WiFi communication at the same time, on the basis of the power consumptions and the communication throughput obtained as a combination of the amp modes and the wireless communication protocols according to each communication (step S605).

The communication control unit 664 selects an amp mode corresponding to the highest communication efficiency among the communication efficiencies calculated by the communication efficiency calculating unit 563, and controls the amp mode setting unit 565 to set the amp mode with the highest communication efficiency (step S606).

The communication control unit 664 determines whether the communication efficiency of the wireless communication using the LTE communication and the WiFi communication at the same time (synchronized wireless communication) is equal to or less than the threshold (step S607). If the communication efficiency during synchronized wireless communication exceeds the threshold (step S607: No), the communication control unit 664 instructs the wireless control unit 130 to continue the wireless communication using the LTE communication and the WiFi communication at the same time (step S608).

Conversely, if the communication efficiency during synchronized wireless communication is equal to or less than the threshold (step S607: Yes), the communication control unit 664 instructs the wireless control unit 130 to disconnect the wireless communication using the WiFi communication that was added most recently (step S609).

As described above, the mobile station 600 according to the sixth embodiment selects an amp mode corresponding to the highest communication efficiency and compares the highest communication efficiency with the threshold. The mobile station 600 disconnects the wireless communication using the most recently added communication protocol among the plurality of communication protocols if the highest communication efficiency is equal to or less than the threshold. As a result, the mobile station 600 according to the sixth embodiment is able to set an optimal amp mode while improving communication throughput and suppressing power consumption.

Embodiment 7

Next, an explanation of a mobile station according to a seventh embodiment will be provided. The mobile station according to the seventh embodiment is similar to the first embodiment except that a communication efficiency calculating unit 763 and a communication control unit 764 are provided respectively in place of the communication efficiency calculating unit 163 and the communication control unit 164 in the mobile station of the first embodiment. Explanations of features and elements that are similar to those of the first embodiment will be omitted.

FIG. 14 illustrates a configuration of the mobile station according to the seventh embodiment. As illustrated in FIG. 14, a mobile station 700 according to the seventh embodiment respectively includes the communication efficiency calculating unit 763 and the communication control unit 764 in place of the communication efficiency calculating unit 163 and the communication control unit 164 in the mobile station 100 of the first embodiment.

The communication efficiency calculating unit 763 calculates the communication efficiencies of wireless communication when the LTE communication and the WiFi communication are used separately, on the basis of the power consumptions and the communication throughput obtained for each of the wireless communication protocols according to each communication. Specifically, the communication efficiency calculating unit 763 obtains the power consumption for the wireless communication using the LTE communication and the power consumption for the wireless communication using the WiFi communication from the power consumption obtaining unit 161. The communication efficiency calculating unit 763 obtains the communication throughput of the wireless communication using the LTE communication and the communication throughput of the wireless communication using the WiFi communication from the communication throughput obtaining unit 162. The communication efficiency calculating unit 763 divides the communication throughput of the wireless communication using the LTE communication by the power consumption of the wireless communication using the LTE communication to calculate the communication efficiency of the wireless communication when the LTE communication is used separately. The communication efficiency calculating unit 763 divides the communication throughput for the wireless communication using the LTE communication and the WiFi communication at the same time by the power consumptions for the wireless communication using the LTE communication and the WiFi communication at the same time, to obtain the communication efficiency of the wireless communication using the LTE communication and the WiFi communication at the same time.

The communication control unit 764 obtains the communication efficiency calculated separately for each of the communication s from the communication efficiency calculating unit 763. The communication control unit 764 determines whether the communication efficiency of the wireless communication using the LTE communication and the WiFi communication at the same time is greater than the communication efficiency of the wireless communication using the LTE communication. If the communication efficiency of the wireless communication using the LTE communication and the WiFi communication at the same time is greater than the communication efficiency of the wireless communication using the LTE communication, the communication control unit 764 instructs the wireless control unit 130 to continue the wireless communication using the LTE communication and the WiFi communication at the same time. If the communication efficiency of the wireless communication using the LTE communication and the WiFi communication at the same time is equal to or less than the communication efficiency of the wireless communication using the LTE communication, the communication control unit 764 instructs the wireless control unit 130 to disconnect the wireless communication using the WiFi communication that was added most recently.

Next, an explanation of processing by a mobile station according to the seventh embodiment will be provided. FIG. 15 is a flow chart of the processing by the mobile station according to the seventh embodiment. The steps S701 to S704 in FIG. 15 are similar to the steps S101 to S104 in FIG. 2 and explanations thereof will be omitted.

The communication efficiency calculating unit 763 separately calculates the communication efficiencies of the wireless communication using the LTE communication and of the wireless communication using the LTE communication and the WiFi communication at the same time, on the basis of the power consumptions and the communication throughput obtained for each of the wireless communication protocols according to each communication (step S705).

The communication control unit 764 determines whether the communication efficiency of the wireless communication using the LTE communication and the WiFi communication at the same time is greater than the communication efficiency of the wireless communication using the LTE communication (step S706). If the communication efficiency of the wireless communication using the LTE communication and the WiFi communication at the same time is greater than the communication efficiency of the wireless communication using the LTE communication (step S706: Yes), the communication control unit 764 performs the processing described below. Specifically, the communication control unit 764 instructs the wireless control unit 130 to continue the wireless communication using the LTE communication and the WiFi communication at the same time (step S707).

Conversely, if the communication efficiency of the wireless communication using the LTE communication and the WiFi communication at the same time is equal to or less than the communication efficiency of the wireless communication using the LTE communication (step S706: No), the communication control unit 764 performs the processing described below. Specifically, the communication control unit 764 instructs the wireless control unit 130 to disconnect the wireless communication using the WiFi communication that was added most recently (step S708).

As described above, the mobile station 700 according to the seventh embodiment disconnects the wireless communication using the most recently added communication protocol if the communication efficiency of the wireless communication using the most recently added communication protocol is equal to or less than the communication efficiency of the wireless communication using the communication protocol that was previously connected. As a result, the mobile station 700 according to the seventh embodiment is able to disconnect wireless communication having poor communication efficiency without performing a threshold determination, and is able to reduce the memory for retaining the threshold and reduce power consumption.

An example of a hardware configuration of each of the mobile stations in this application described as follows. The mobile station in this application includes a wireless interface, a processor, a memory, a digital circuit, and an analog circuit, for example. A wireless interface is an interface device that is used to perform wireless communication with a base station. For example, a wireless interface is constructed by an antenna and analog circuits. A processor is a device that processes data. Examples of the processor are a central processing unit (CPU) and a digital signal processor (DSP). A memory is a device that stores data. Examples of the memory are a read only memory (ROM) and a random access memory (RAM). A digital circuit is an electronic circuit that performs a digital operation. Examples of the logical circuit are a large scale integration (LSI), a field-programming gate array (FPGA) and an application specific integrated circuit (ASIC). An analog circuit is an electronic circuit that performs an analog operation.

Correspondence relationships between the mobile station 100 illustrated in FIG. 1, the mobile station 200 illustrated in FIG. 3, the mobile station 300 illustrated in FIG. 5, the mobile station 400 illustrated in FIG. 7, the mobile station 500 illustrated in FIG. 10, the mobile station 600 illustrated in FIG. 12, or the mobile station 700 illustrated in FIG. 14 and the hardware configuration are described as follows. For example, the antennas 111*a* and 111*b* correspond to the wireless network interface. For example, the LTE wireless communication unit 110 and the WiFi wireless communication unit 120 correspond to the analog circuit, the digital circuit, the processor, and the memory. For example, the wireless communication unit 130, IP packet processing unit 140, application processing unit 150, and the main control unit 160, 260, 360, 460, 560, 660, or 760 correspond to the processor, the memory and the digital circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
a plurality of antennas configured to perform an aggregated wireless communication including a plurality of wireless communications based on a plurality of wireless communication protocols simultaneously, each antenna being configured to perform each wireless communication based on each wireless communication protocol; and
a processor configured
to calculate, during simultaneous communication of the wireless communication protocols of the wireless communication device, an aggregated communication efficiency that is a communication efficiency of the wireless communication device in performing the aggregated wireless communication, the aggregated communication efficiency being determined based on an aggregated power consumption and an aggregated communication throughput, the aggregated power consumption being a total of a plurality of power consumptions for the plurality of wireless communication protocols in the wireless communication device in performing the aggregated wireless communication, the aggregated throughput being a total of a plurality of throughputs for the plurality of wireless communication protocols in the wireless communication device in performing the aggregated wireless communication,
to continue the aggregated wireless communication when the aggregated communication efficiency exceeds a given value and to stop one of the plurality of wireless communication included in the aggregated wireless communication when the aggregated communication efficiency is equal to or less than the given value.

2. The wireless communication device according to the claim 1,
wherein the processor is configured to stop a wireless communication protocol that is added lastly among the plurality of wireless communication protocols when the aggregated communication efficiency is equal to or less than the given value.

3. The wireless communication device according to claim 1,
wherein the processor is configured
to calculate each of a plurality of individual communication efficiencies of each of the plurality of the wireless communication protocols, based on the plurality of the power consumptions and the plurality of the communication throughput, and
to stop, when the aggregated communication efficiency is equal to or less than the given value, a wireless communication protocol whose the individual communication efficiency is the lowest among the plurality of the wireless communication protocols.

4. The wireless communication device according to claim 1, wherein
the processor is configured
to monitor whether data transmitted through the wireless communication using the plurality of wireless communication protocols simultaneously is guaranteed data that includes a requested communication throughput, and extracts the requested communication throughput from data, and
to stop a lastly added wireless communication system, when the aggregated communication efficiency is equal to or less than the given value and the communication throughput of the wireless communication using a wireless communication protocol other than a lastly added wireless communication protocol among the plurality of wireless communication protocols satisfies the requested communication throughput.

5. The wireless communication device according to the claim 1, wherein
the processor is configured
to obtain a remaining battery capacity that represents the remaining capacity of a battery mounted in a mobile terminal device,
to update the given value so that the given value increases correspondingly to a decrease in the remaining battery capacity, and
to stop the wireless communication using any wireless communication protocol when the communication efficiency is equal to or less than the given value updated.

6. The wireless communication device according to the claim 1, further comprising:
a plurality of amplifiers configured to perform a plurality of amp modes in which applied amplifiers of some of the amplifiers are applied to the plurality of wireless communication protocols respectively, the numbers of the applied amplifiers are different among the amp modes;
wherein the processor is configured
to obtain the power consumptions for each combination of the amp modes and the wireless communication protocols,
to obtain the communication throughput for each combination of the amp modes and the wireless communication protocols,
to calculate aggregated communication efficiencies for each combination of the amp modes and the wireless communication protocols, based on the power consumptions and the communication throughput,
to compare the aggregated communication efficiencies with the given value respectively in descending order of the communication throughput corresponding to the aggregated communication efficiencies respectively, and
to control the plurality of the antennas, when one of the aggregated communication efficiencies exceeds the given value, as to perform the plurality of wireless communication protocols corresponding to the one of the aggregated communication efficiencies simultaneously, and, when an aggregated communication efficiency whose communication throughput is minimum is equal to or less than the given value, as to stop one of the plurality of wireless communication protocols.

7. The wireless communication device according to the claim 1, further comprising:
a plurality of amplifiers configured to perform a plurality of amp modes in which applied amplifiers of some of the amplifiers are applied to the plurality of wireless communication protocols respectively, the numbers of the applied amplifiers are different among the amp modes;
wherein the processor is configured
to obtain the power consumptions for each combination of the amp modes and the wireless communication protocols, to obtain the communication throughput for each combination of the amp modes and the wireless communication protocols, to calculate aggregated communication efficiencies for each combination of the amp modes and the wireless communication protocols, based on the power consumptions and the communication throughput, and to control the plurality of the antennas, when one of aggregated communication efficiencies whose communication throughput is maximum exceeds a given value, as to perform the plurality of wireless communication protocols simultaneously, and, when the one of aggregated communication efficiencies whose communication throughput is maximum is equal to or less than the given value, as to stop one of the plurality of wireless communication protocols.

8. A wireless communication device according to claim 1, wherein
each wireless communication protocol corresponds each wireless communication standard.

9. A wireless communication device according to claim 1, wherein
the plurality of wireless communication protocols includes long term evolution (LTE) and wireless fidelity (Wi-Fi).

10. A wireless communication method for a communication device including a plurality of antennas configured to perform an aggregated wireless communication including a plurality of wireless communication based on a plurality of wireless communication protocols simultaneously, each antenna being configured to perform each wireless communication based on each wireless communication protocol, the wireless communication method comprising:

calculating, during simultaneous communication of the wireless communication protocols of the wireless communication device, an aggregated communication efficiency that is a communication efficiency of the wireless communication device in performing the aggregated wireless communication, the aggregated communication efficiency being determined based on an aggregated power consumption and an aggregated communication throughput, the aggregated power consumption being a total of a plurality of the power consumptions for the plurality of wireless communication protocols in the wireless communication device in performing the aggregated wireless communication, the aggregated throughput being a total of a plurality of the communication throughputs for the plurality of wireless communication protocols in the wireless communication device in performing the aggregated wireless communication; and continuing the aggregated wireless communication when the aggregated communication efficiency exceeds a given value, and to stop one of the plurality of wireless communication included in the aggregated wireless communication when the aggregated communication efficiency is equal to or less than the given value.

11. The wireless communication method according to the claim 10, further comprising:
stopping a wireless communication protocol that is added lastly among the plurality of wireless communication protocols when the aggregated communication efficiency is equal to or less than the given value.

12. The wireless communication method according to claim 10, further comprising:
calculating each of a plurality of individual communication efficiencies of each of the plurality of the wireless communication protocols, based on the plurality of the power consumptions and the plurality of the communication throughput; and stopping, when the aggregated communication efficiency is equal to or less than the given value, a wireless communication protocol whose the individual communication efficiency is the lowest among the plurality of the wireless communication protocols.

13. The wireless communication method according to the claim 10, further comprising:
monitoring whether data transmitted through the wireless communication using the plurality of wireless communication protocols simultaneously is communication throughput guaranteed data that includes a requested communication throughput, and extracts the requested communication throughput from data; and stopping, when the aggregated communication efficiency is equal to or less than the given value and the communication throughput of the wireless communication using a wireless communication protocol other than a lastly added wireless communication protocol among the plurality of wireless communication protocols satisfies the requested communication throughput, the lastly added wireless communication protocol.

14. The wireless communication device according to the claim 10, further comprising:
obtaining a remaining battery capacity that represents the remaining capacity of a battery mounted in a mobile terminal device;

updating the given value so that the given value increases correspondingly to a decrease in the remaining battery capacity; and stopping the wireless communication using any wireless communication protocol when the communication efficiency is equal to or less than the given value updated.

15. The wireless communication device according to the claim 10, further comprising:
obtaining the power consumptions for each combination of amp modes and the wireless communication protocols, the communication device including a plurality of amplifiers configured to perform a plurality of the amp modes in which applied amplifiers of some of the amplifiers are applied to the plurality of wireless communication protocols respectively, the numbers of the applied amplifiers are different among the amp modes;

obtaining the communication throughput for each combination of the amp modes and the wireless communication protocols;

calculating aggregated communication efficiencies for each combination of the amp modes and the wireless communication protocols, based on the power consumptions and the communication throughput;

comparing the aggregated communication efficiencies with the given value respectively in descending order of the communication throughput corresponding to the aggregated communication efficiencies respectively; and controlling the plurality of the antennas, when one of the aggregated communication efficiencies exceeds the given value, as to perform the plurality of wireless communication protocols corresponding to the one of the aggregated communication efficiencies simultaneously, and, when an aggregated communication efficiency whose communication throughput is minimum is equal to or less than the given value, as to stop one of the plurality of wireless communication protocols.

16. The wireless communication device according to the claim 10, further comprising:
- obtaining the power consumptions for each combination of amp modes and the wireless communication protocols, the communication device including a plurality of amplifiers configured to perform a plurality of the amp modes in which applied amplifiers of some of the amplifiers are applied to the plurality of wireless communication protocols respectively, the numbers of the applied amplifiers are different among the amp modes;
- obtaining the communication throughput for each combination of the amp modes and the wireless communication protocols;
- calculating aggregated communication efficiencies for each combination of the amp modes and the wireless communication protocols, based on the power consumptions and the communication throughput; and
- controlling the plurality of the antennas, when one of aggregated communication efficiencies whose communication throughput is maximum exceeds a given value, as to perform the plurality of wireless communication protocols simultaneously, and, when the one of aggregated communication efficiencies whose communication throughput is maximum is equal to or less than the given value, as to stop one of the plurality of wireless communication protocols.

\* \* \* \* \*